US012602036B2

(12) United States Patent
Mears et al.

(10) Patent No.: US 12,602,036 B2
(45) Date of Patent: Apr. 14, 2026

(54) SYSTEM FOR PREDICTIVE OPERATIONAL ANALYSIS OF A MACHINERY COMPONENT

(71) Applicant: Clemson University, Clemson, SC (US)

(72) Inventors: Laine Mears, Clemson, SC (US); Ethan Wescoat, Clemson, SC (US)

(73) Assignee: Clemson University, Clemson, SC (US)

( * ) Notice: Subject to any disclaimer, the term of this patent is extended or adjusted under 35 U.S.C. 154(b) by 710 days.

(21) Appl. No.: 17/988,497

(22) Filed: Nov. 16, 2022

(65) Prior Publication Data

US 2023/0152792 A1     May 18, 2023

Related U.S. Application Data

(60) Provisional application No. 63/280,023, filed on Nov. 16, 2021.

(51) Int. Cl.
G05B 23/02          (2006.01)
(52) U.S. Cl.
CPC ...... *G05B 23/0224* (2013.01); *G05B 2223/02* (2018.08)
(58) Field of Classification Search
CPC ............ G05B 23/0224; G05B 2223/02; H01L 21/67276; B25J 19/00; B25J 19/02; G06F 3/14
See application file for complete search history.

(56) References Cited

U.S. PATENT DOCUMENTS

2021/0148791 A1* 5/2021 Huang .................. B25J 9/1674

FOREIGN PATENT DOCUMENTS

WO     WO-0004361 A1 * 1/2000 .......... G01M 13/045

OTHER PUBLICATIONS

Huan Hang, Natalie Baddour, Bearing vibration data collected under time-varying rotational speed conditions, journal, Nov. 9, 2018, 5 pp., Data in Brief 21 (2018) 1745-1749, Elsevier Ltd., Netherlands.

(Continued)

*Primary Examiner* — Stephen D Meier
*Assistant Examiner* — Quang X Nguyen
(74) *Attorney, Agent, or Firm* — Kim and Lahey Law Firm, LLC; Douglas W. Kim

(57) ABSTRACT

A system of digitally representing equipment failure comprising: a testing assembly for testing a component of a manufacturing equipment wherein the component includes a defect in a critical area included in the component; a sensor in communications with the testing assembly for sensing a failure state of the component, a set of computer readable instructions adapted for: receiving a critical failure mode associated with the component, receiving a testing dataset from the sensor representing testing results produced by the testing assembly wherein the testing dataset includes initial data representing an undamaged component and a failure dataset representing a failed component, isolating a set of failure data representing a testing status of the component from initial testing to failure of the component determined by the critical failure mode, creating a usable lifetime model of the component according to the set of failure data.

18 Claims, 20 Drawing Sheets

(56) References Cited

OTHER PUBLICATIONS

Christian Lessmeier, James Kuria Kimotho, Detmar Zimmer, and Walter Sextro, Condition Monitoring of Bearing Damage in Electromechanical Drive Systems by Using Motor Current Signals of Electric Motors: A Benchmark Data Set for Data-Driven Classification, symposium's scholarly article, 2016, 17 pp., European Conference of the Prognostics and Health Management Society 2016, US.

Patrick Nectoux, Rafael Gouriveau, Kamal Medjaher, Emmanual Ramasso, Brigitte Chebel-Morello, Noureddine Zerhouni, Christophe Varnier, Pronostia: An experimental platform for bearings accelerated degradation tests, scholarly article, Jun. 20, 2012, 9 pp., hal-00719503, Denver, Colorado, US.

Hai Qiu, Jay Lee, Jing Lin, Gang Yu, Wavelet filter-based weak signature detection method and its application on rolling element bearing properties, journal, May 31, 2005, 25 pp., Journal of Sound and Vibration 289 (2006) 1066-1090, Elsevier Ltd., Netherlands.

Wade A. Smith, R.B. Randall, Rolling Element Bearing Diagnostics Using the Case Western Reserve University Data: A Benchmark Study, scholarly article, May 15, 2015, 45 pp., DOI: 10.1016/j.ymssp.2015.04.021, ResearchGate, Germany.

Biao Wang, Yaguo Lei, Naipeng Li, Ningbo Li, A Hybrid Prognostics Approach for Estimating Remaining Useful Life of Rolling Element Bearings, scholarly article, Mar. 2020, 12 pp., vol. 69, No. 1, IEEE Transactions on Reliability, US.

* cited by examiner

SYSTEM FOR PREDICTIVE OPERATIONAL ANALYSIS OF A MACHINERY COMPONENT

RELATED APPLICATIONS

This application is a non-provisional patent application claiming priority from U.S. Patent Provisional Application Ser. No. 63/280,023 filed Nov. 16, 2021 which is incorporated by reference.

BACKGROUND OF THE INVENTION

1) Field of the Invention

This system is a purposeful failure system adapted to generate labeled defect training data at both the component and system level, from initial defect to final destruction.

2) Description of the Related Art

Digitization of manufacturing allows for modeling and diagnosing equipment failure, but training such systems is difficult without observations of failed states. Currently, creating failure classifiers and predictive models of manufacturing equipment suffer from at least two problems: training-data accuracy and data representation of lifetime machine failure modes of both components and systems.

There is an increase in global competition in about every industry. This increase drives market participants to seek reduction in production costs and time with the goal of maximizing profit. Using the large amount of data that is generated by the manufacturing and other industries, industry leaders seek to extract information to minimize costs and increase throughput. One area that can produce significant costs is unexpected equipment and therefore production downtime, due to equipment failure. For example, CNC tool breakages have been reported to account for 20% of the total CNC machine downtime. One attempt to reduce downtime is to implement a sensor monitoring network that can improve machine productivity by at least 40%.

Machine monitoring systems constantly change to use new methods of data gathering, data types, and data augmentation. In one study, sixty journal papers on CNC monitoring systems were reviewed that noted the application monitored, the measuring technique and device, and the signal acquisition. From this study, it was concluded that a consensus for the methodology in the application of monitoring technologies in CNC machines, detailing the changes in methods and techniques over time, is needed. This study describes the potential for a standardized CNC machine monitoring system using the consensus methodology.

Changes in machine monitoring and data collection methods are not limited to rotational machinery. For example, in assembly operations such as part-to-part connections, audible clicks are sometimes an indication of task completion. In a manufacturing environment with harsh background noise, these clicks do not always register and may cause rework if missed. On study provides a digital and physical filtration method to detect clicks from a remote microphone. Through testing, the classification matrix of this study reported an accuracy greater than 90%.

In 3D printing, printer sounds indicate specific operation executions and possible errors. Detecting these errors early, before the printer fails, can save material and time. One study resulted in the creation of a neural network for anomaly detection using sound data in 3D printing. In cases where data were not widely available, this study used data augmentation to increase the training sample size and classification accuracy. These two applications highlight the change in methodology in building classifiers by using data filtration and pretraining.

With the establishment of different manufacturing monitoring systems, data is more accessible for creating models addressing challenges in quality and maintenance. A prevalent problem, however, is the detection and accurate recording of failure events, particularly root cause(s), as highlighted in one study. This study evaluates the needs and challenges for prognostics and health management in manufacturing and focuses on the use of smart manufacturing test beds to simulate the challenges of a manufacturing environment in the search for monitoring solutions. A subsequent problem in detecting intermittent failures is clear data communication and the possibility of multiple compounding failures that complicate the prediction of remaining useable machine life.

Further review on the use of big data in manufacturing by one study highlights the need for consistent data representation, cleaning, and management to provide the basis for big data analysis. One study focused on the historical and real-time data management requirements, from the collection to the analysis stage, to allow online learning to occur in a timely and feasible manner. This study comments on the reliability and scalability of data storage and preprocessing and further notes the difficulty of matching data events to specific movements within a manufacturing operation. It is believed that if data applications misrepresent manufacturing events, then further analysis is misleading.

In detecting manufacturing equipment failures, data gathered from healthy and failed components are used to represent the potential for machine failure. As an example, bearings, which have numerous failure modes, are extensively studied for faults in manufacturing components and equipment. One study reviewed and created a rolling element bearing diagnostics testbed for run-to-failure lifetime testing. The review summarized the use of multi-sensor fusion and different data features in detecting bearing damage over time. However, run-to-failure tests are either time-intensive or cost-prohibitive, and waiting for the damage to occur is not always possible for manufacturers.

Researchers have explored the use of artificially damaging components to represent failure and create datasets for testing. One study discusses the use of artificial damage in bearings with motor current state signals for condition monitoring. For analysis, this study used the artificially generated bearing datasets for validation and testing predictive failure classifiers of real motor failures. The proposed methods for damage involve drilling holes into bearing surfaces or the use of an electro discharge machining to make sharp etches. While these methods are suitable for the isolation of damage and the visualization of failure phenomena in the data, the application to manufacturing is difficult due to the "clean" nature of the defect, not accurately representing the damage signal in a typical manufacturing component. Applying this artificial component damage data to a manufacturing system application is not entirely representative of expected equipment failure and makes remaining useable lifetime calculations difficult.

Matching simulated damage to existing manufacturing components and system failures requires a precise method representing known failure phenomena. One proposed method involves isolating an area within a system and introducing failures piecewise to specific components. This proposed method includes a damage protocol for damaging a CNC spindle, testing improper lubrication, coolant contamination, and brinelling of the spindle bearings meant to generate lifetime failure data of a spindle from the baseline case to the failure case. The damage was isolated to each of these systems to prevent excess damage to the machine. However, due to an early system failure, this study could not gather a full failure dataset. Before damage is applied, further analysis and preparation are needed to prevent early failure.

Generating useful manufacturing system failure data, therefore, requires further development. Contrived failure data representative of a manufacturing system will improve failure classification in terms of accuracy and usefulness within a manufacturing system.

BRIEF SUMMARY OF THE INVENTION

The above objectives are accomplished by providing a system of digitally representing equipment failure comprising: a testing assembly for testing a component or part of manufacturing equipment wherein the component includes a defect in a critical area introduced to the component; a sensor or set of sensors in communication with the testing assembly for sensing a failure state of the component, a set of computer readable instructions adapted for: receiving description of a critical failure mode associated with the component, receiving a testing dataset from the sensor representing testing results produced by the testing assembly wherein the testing dataset includes initial data representing an undamaged component and a failure dataset representing a failed component due to known cause, isolating a set of failure data representing the status of the component from initial testing to failure of the component determined by the critical failure mode, creating a usable lifetime model of the component according to the set of failure data wherein the usable lifetime includes failure classifications taken from the group consisting of primary failure, secondary failure, command fault, sudden failure, gradual failure, evident failure, hidden failure, partial failure, complete failure and any combination thereof, receiving the current status of an operation component, mapping the current status of the operational component to the usable lifetime model, and, displaying the anticipated failure prognosis of the operational component.

The sensor or set of sensors can be adapted to sense the current status of the operational component. The set of computer readable instructions can be adapted for determining a difference between the usable lifetime model and a failure timeline of the component and modifying the usable lifetime model according to the difference. Therefore, the system can be machine learning as the usable lifetime model can be modified with each analysis of an operational component. A user can provide the system with the actual status of directed to the operational life of a component, where the information can be used to modify the useful life model. When the system is used for the analysis of multiple components across multiple locations, factors such as date, time, location, environment, and other specific information can be included in the useful model. The failure timeline can include prediction from the initial status (baseline) to anytime along the operational life to complete failure (failure to operate or even destruction).

The sensor can be adapted for sensing the operation of the testing assembly so that the useful lifetime model can be created according to the testing environment. For example, the lubrication used in testing can be of a first type and the operational component can include lubrication of a second type and the useful lifetime model can account for these differences (e.g., conventional oil vs. synthetic oil, or a controlled change in viscosity). The usable lifetime model can be created by using a method of prewhitening the set of failure data and performing an envelope spectrum analysis on the prewhitened failure data. The usable lifetime model includes an input selected from the group consisting of a rotating element, rotational speed, element diameter, cycles, element length, travel path, pitch diameter, contact angle, contact surface, load, tensile force, shear force, and any combination thereof. These factors can be component specific, for example, the piston rings of an engine, the piston forces and the bearing surfaces associated with the piston motion.

This system can include a sensor adapted for sensing a current status of an operational component along its operational life (e.g., initial installation, complete destruction). Note that a component does not have to have complete failure to be replaced. The set of computer readable instructions and faire dataset can be adapted for different levels and types of failures. For example, the sensor can be adapted to sense a lubrication status. The set of computer readable instructions can be adapted for receiving the usable lifetime model from a remote computer system. The usable lifetime model can be adapted to be modified by the remote computer system according to multiple mapping of a plurality of operational components current status. Therefore, the useful lifetime model can use artificial intelligence and machine learning so that it can be modified overtime and as more data is available. The usable lifetime model can include inputs taken from the group comprising of operational component make, model, manufacturer, year made, maintenance, location, machinery, lubrication, age, and any combination thereof.

This failure dataset can include data prior to the complete failure of the component. The usable lifetime model can be adapted to be modified according to a mapping of the current status of an operational component to the usable lifetime model thereby providing a machine learning feedback system. The usable lifetime model is adapted to be modified according to a mapping of the current status of a plurality of operational components to the usable lifetime model. The defect in a critical area can cause one or more failures. The usable lifetime model can be adapted to provide progressive damage anticipation from use of the operational component.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

Figure 1A:
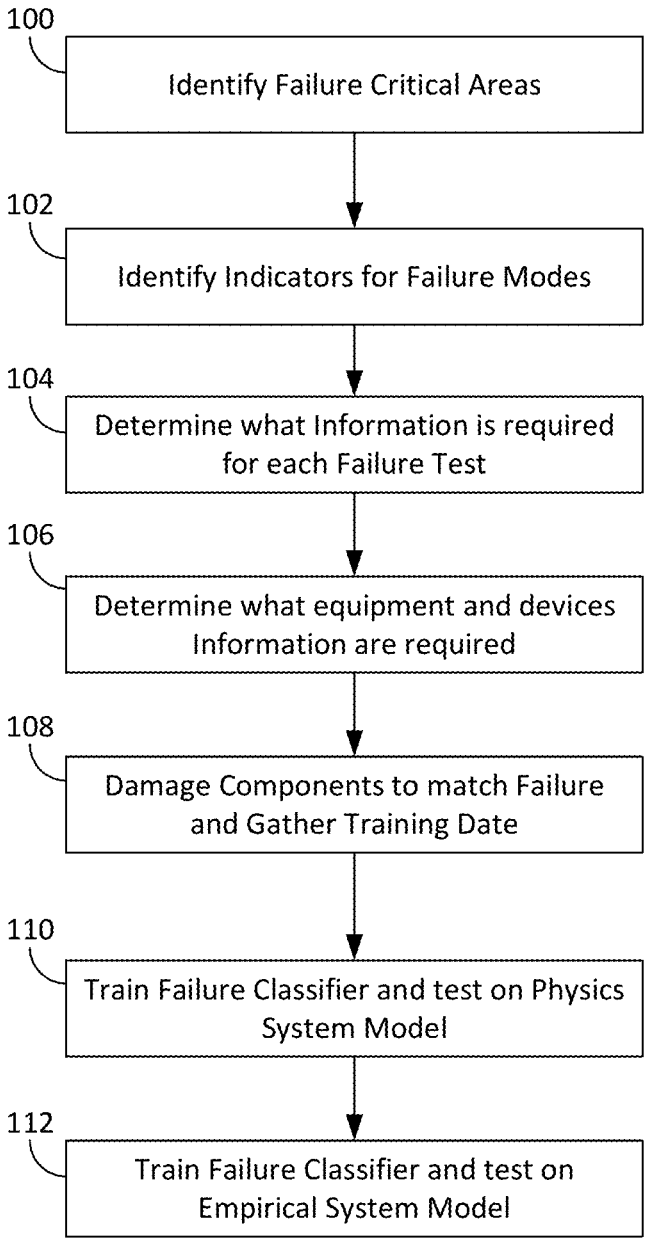
FIG. 1A is a flowchart showing the system including steps of some of the stages for each portion of the system and method.

This specification uses bearings as an example to provide for a validation case wherein the bearings are monitored from a healthy baseline state to a maximum-damage state by applying artificial damage. Bearings are a useful example for illustrating and validating this system due to the existing knowledge of failure progression, as well as the prevalent use of bearings in industry. Components that are associated with rotation are particularly subject to with wear, fatigue and defects from extended use. Such components include, but are not limited to, fans, pumps, robots and spindles. The data generated were analyzed and compared to expected failure phenomena predictions. The results of this system show that generating failure data for machine health models as described herein is a useful addition and improvement of the existing technology and industry.

This system provides a methodology to generate representative training data for manufacturing systems and apply it to an actual production system to detect potential failures. This system induces damage in components and places those damaged components into a manufacturing system to understand the effect on system performance and propagation of failure. Inducing progressive damage modes in a controlled manner generates a lifetime failure data set in relatively short test time. Gathering this progressive damage from the initial defect point to failure gives an accurate representation of lifetime data for a manufacturing system. The propagation of multiple progressive failures is observable from the inception of a defect until its catastrophic demise.

With reference to the drawings, the invention will now be described in more detail.

This system provides for a method whereby failure data, from the baseline to the destruction case, is methodically generated to train machine health models. This system provides for an approach to purposeful failure and uses an example showing this system applied to a manufacturing component. This bearing-based example shows the system can generate a lifetime of defect training data. It compares the training data with defect data found in a real manufacturing application. The system purposefully generates a database of failure data for a given system.

With manufacturing equipment components, defects are understood in both the origin and way they progress. These defects, if left unchecked over time, can cause total failure and substantially increase costs for manufacturing operations. For accurate prediction in preventing failure, each failure type needs a unique data set not only for the actual failure case but for the events leading from the defect inception to failure. This system creates training data from the healthy baseline case to the failure case for different causes, thereby providing a dataset to predict eventual failures. The system includes computer readable instructions and steps for the identification of critical failure modes of a manufacturing system and its components. The identification can originate from historical data and failure modes effects analyses. The system can include the isolation of failure signals to specific failure modes associated with each component. This step can identify which modes will be targeted based on history or designer preference. This system can determine the information required from data sources to ensure proper data labeling. The appropriate data sources and capture methods can be identified. The system can include damage components through replication of the associated failures and corroborate generated data in comparison to other tests performed in prior literature. This system can link data back to the actual application of the system through means of data transformation. The system can create the failure classifier based on the generated data and retest the system with the initial stages of failure to determine accuracy and precision relative to actual part and system damage.

The steps included in this system can provide a guideline to damage components in a known way for analysis at the component and system level. The system can establish the data labeling of the component state, linking the damage to manufacturing failures. These steps can generate data to create failure classifiers and models for the remaining useable lifetime. Studying the damage propagation from the initial defect stage to failure allows reproducible failure through artificial means to gather data for training in failure classifiers and models.

Bearings, as an example, can serve as a validation example for testing the method outlined herein and shown in FIG. 1A. Critical failure areas of the bearing identified at 100. Indicators for failure can be identified at 102. A non-exhaustive list of indicators can include noise, vibration, ultrasonic emission, out-of-plane motion, temperature and the like as discussed herein. Information for each operational component to be tested can be determined at 104. The testing process and testing device can be determined and acquired at 106. Causes of failure are introduced at 108 and a testing component is operated until it approaches or passes one or more failure states. Computer readable instructions can be used to provide for a monitoring system that can monitor an operational component and provide notifications when the operating component approaches or exceed a failure state at 110. A central server can receive testing information and operation information and can adjust the failure dataset according to the information received from the multiple sources at 112.

Figure 1B:
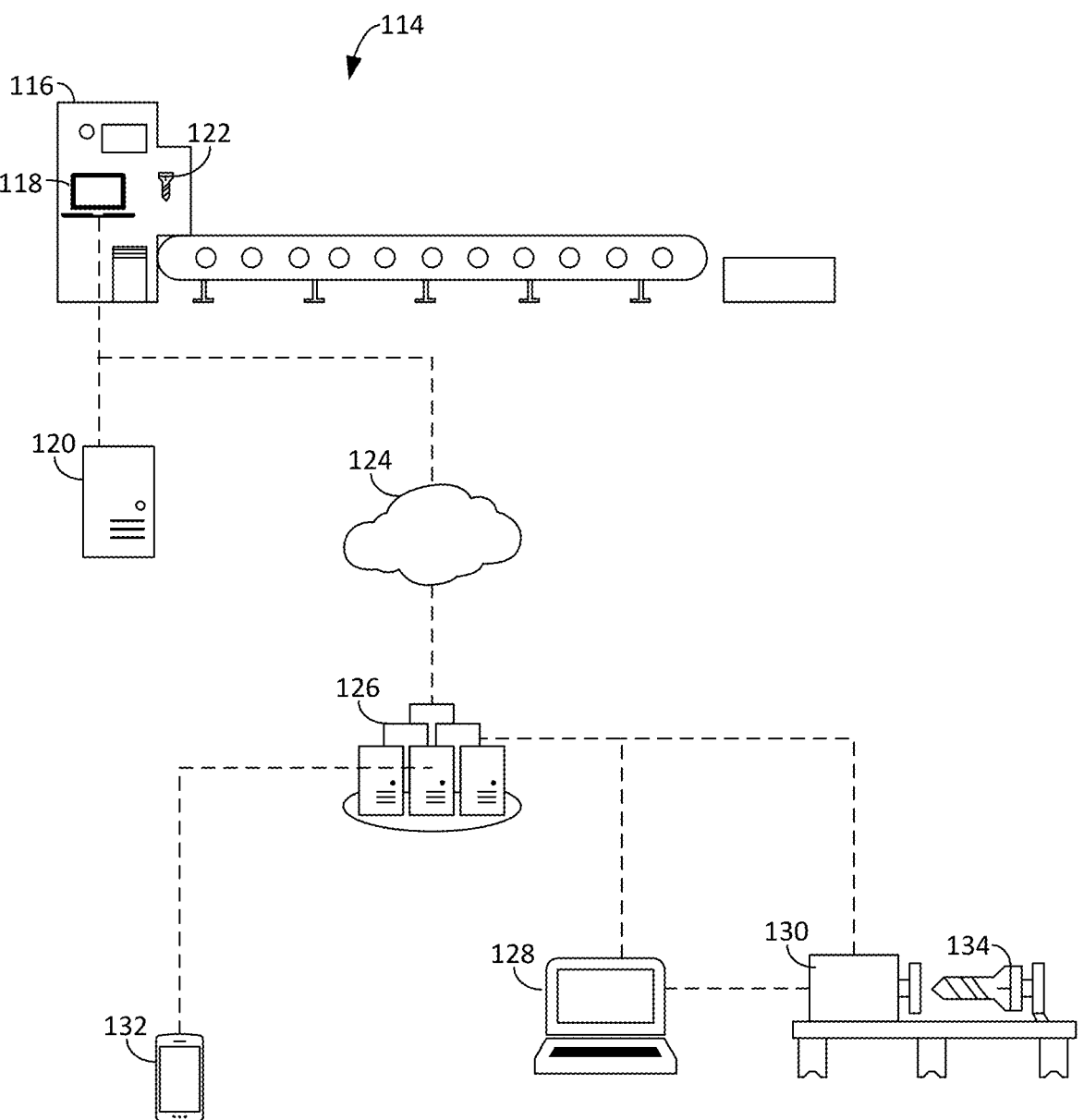
FIG. 1B is a schematic showing components and communications between the components.

Referring to FIG. 1B, the system is shown wherein that is an operational environment 114 that can include one or more machines 116. The machine can include or be in communications with a monitoring system 118. The monitoring system can include sensors that can measure aspects of the machine or one or more components of the machine such as cycles, temperature, noise, vibration and the like. The sensors can be included with the monitoring system or can be in communications with the monitoring system. The monitoring system can also receive information from third party sources such as power used from a facilities management system 120, cycles from associated machines (e.g., feeder) and the like. The machine can include an operational component 122 (e.g., spindle, bearing, joint and the like). The monitoring system can be in communication with the facilities management system through a communications network 124 or directly as part of a local area network. The monitoring system can also receive information manually.

A server 126 can be in communication with the monitoring system and the facilities system as well as the testing device 128, testing computer system 130. A user device 132 can also be in communication with various systems.

As discussed further, the monitoring system 118 can provide an operational component characteristics dataset as well as monitor the performance of the operational component 122. This information can be provided to a server 126 and testing computer system 128. The testing computer system can receive data from a testing device 130 that tests a testing component 134. The testing device and testing computer system can create a failure dataset that can be provided to the monitoring system. The monitoring system, upon receiving information concerning performance characteristics of the operational component, can compare the operational performance with the failure dataset and take action accordingly. The action can include creating a warning, creating a notification, transmitting the warning and notifications, altering the operation of the operating component or machines or halting the operations of the operating component and machine.

Figure 2:
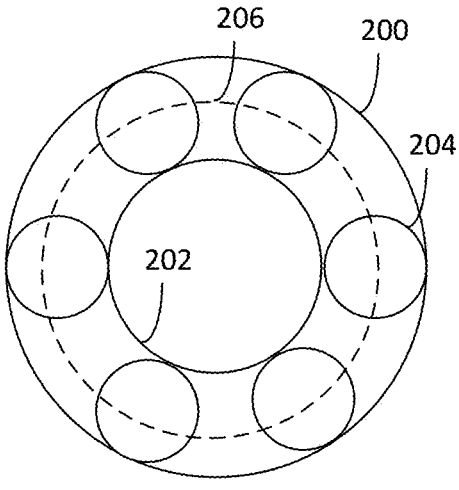
FIG. 2 is a schematic illustrating different parts of an exemplary bearing including an outer race, cage and rolling elements, and the inner race.

By way of example, FIG. 2 shows the main components of a bearing including the outer race 200, inner race 202, rolling element 204 and cage 206. Bearings have multiple testable failure modes, each one appearing differently depending on where the defect is on the bearing. Bearings also have an in-depth background modeling landscape available on bearing damage. Each area on the bearing is susceptible to defects. Defects, left unchecked, can lead to critical failure for equipment. A common cause of bearing failure is contamination. Bearing contamination has multiple different Sources. Contamination from corrosion stems from the temperature changes in the bearing, allowing for the buildup of moisture inside the bearing seals. Improper lubrication from improper servicing causes contamination of the bearing and can lead to premature wear and fatigue of the bearing. Under-lubrication can cause premature wear while over-lubrication can create unnecessary stress and failure on components, housing and the like. In either case, these defects can cause peeling, pitting, or plastic deformation damage of the bearing, or in a severe case, the total lockup or seizing of the bearing.

Further bearing contamination can come from hard particles. Metal chips or particles of dirt enter the raceway area of the bearing and, over time, cause pitting or brinelling defect points in these elements. This abrasive contamination leads to eventual spalling, characterized as the delamination or "flaking" of the bearing material, which takes the appearance of a scrape or delamination on the bearing surface. The excessive loading of the bearing exaggerates the defect mode. The primary damaged components in spalling are the inner race, the outer race, and the rolling element. Spalling can begin as an initial defect under the right circumstances in addition to an advance form in pitting and brinelling defects. Spalling is one of two typical results for contamination damage, as seen in literature, the other being artificial dents.

Figure 3:
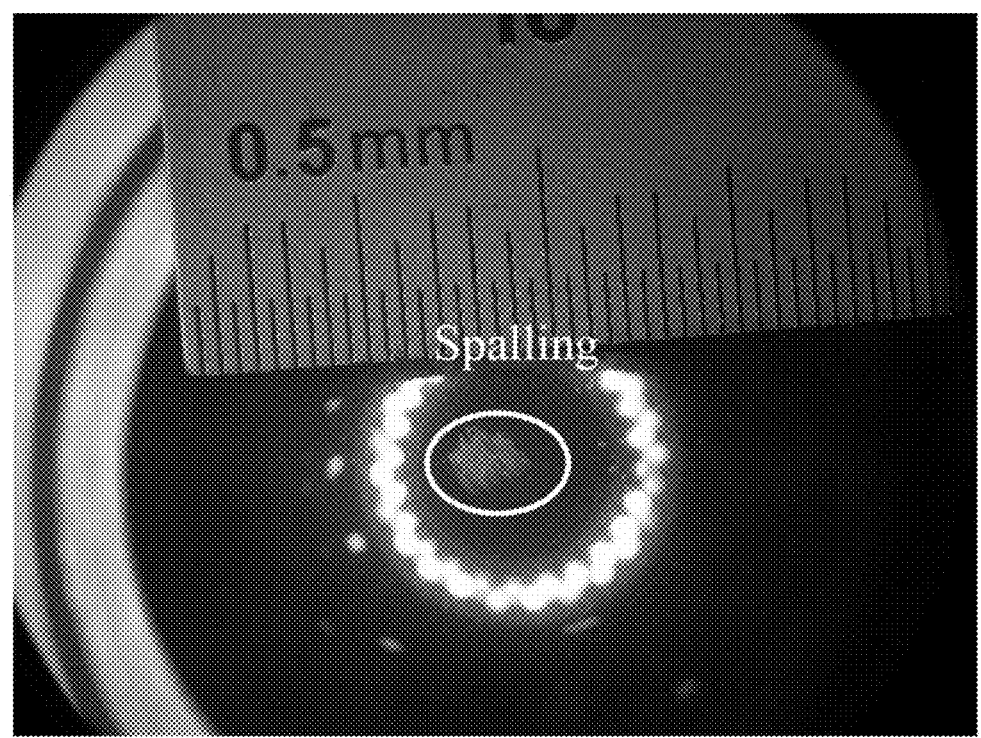
FIG. 3 is a photograph of a damaged bearing taken from a car vertical lift wherein the damage was detected using a vibration sensor attached to the bearing housing.
Figure 4:
FIG. 4 is a photograph of a damaged bearing from a vertical lift rail runner in an advanced failure state.

One of the best ways to simulate contamination-induced damage is through spalling damage in the manner as seen in FIGS. 3 and 4. The primary characteristics observed for the damage were the "flaking" and rough appearance of the bearing surface. In the extreme case shown in FIG. 4, the damage was more substantial in the origin of the defect. As an application example, FIG. 3 shows an initial defect in a ball bearing, and FIG. 4 shows the severe damage to an inner race defect that leads to equipment failure. Both defects come from heavy-duty lift equipment in a manufacturing environment. The damage shown in both FIG. 3 and FIG. 4 was caused by excessive use and loading, resulting in spalling.

This system can provide for corroboration of data generated to prior failure data to increase confidence that the data generated by the system is representative of real-world failure. Datasets should include data collected from components that are artificially damaged by trauma (such as dropping the component prior to installation) and fatigue as well as contamination and, if applicable, improper lubrication.

Figure 5:
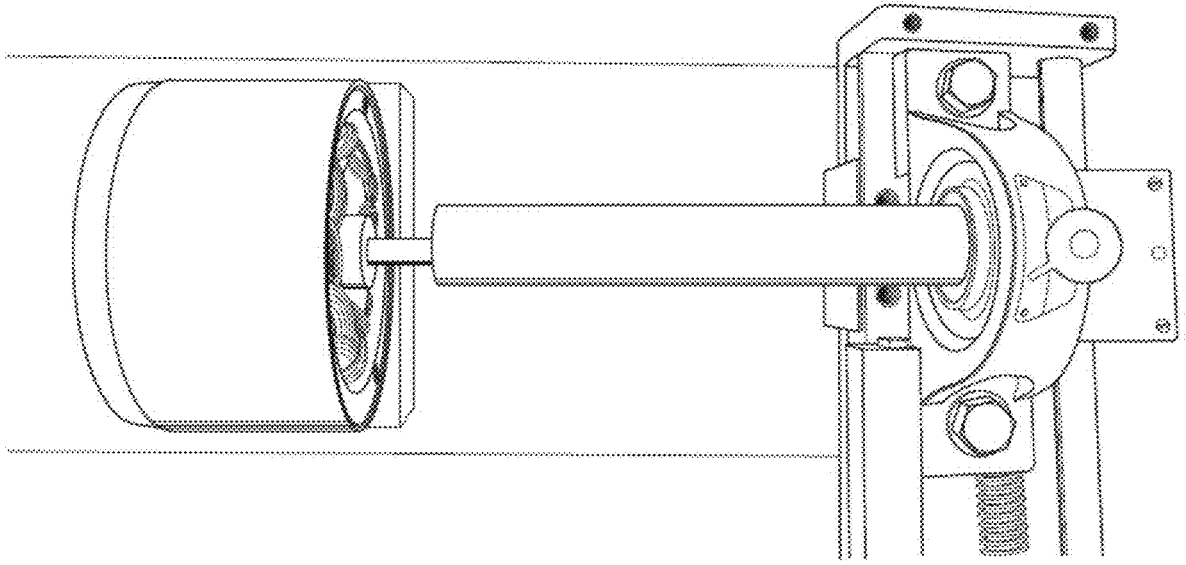
FIG. 5 is a photograph of bearing test station including a motor housing for running a shaft and a linear actuating table allowing the introduction of a shaft load on the testing bearing.

FIG. 5 shows a bearing test configuration. The motor in this exemplary embodiment is a 24 VDC brushed motor. The motor input current is 14 A and provides an output of 250 W. The motor houses the defect bearing, located on the motor shaft. The shaft is 25.4 cm long and connected to another bearing. This set bearing attaches to a linear actuating mechanism, which is a 200 mm manual sliding table with a locking clamp. The sliding table induces the radial misalignment of the bearing station, simulating the load a bearing experience. The loading does not exceed a maximum of 0.50 kN, with a maximum tested load of 0.25 kN. The modular station allows easy changes for future testing of multiple damage use cases.

In this example, the vibration sensor is perpendicular to the shaft and motor. An IFM VSA001 vibration sensor can be used to collect data, attached using a screw mounted hole built into the side of the bearing station. The range of the can be +/−25 g. The sampling rate of the sensor can be 50 kHz. The sensor calibration is verified using a shaker table oscillating at a set frequency. Time-based data collected from this sensor is converted to the frequency spectrum to check the frequency. The data acquisition system can be an IFM VSE002, which also provides visualization of the readings during the test. This example can provide for current and temperature monitoring for possible sensor fusion in future tests. The data set can be saved to a computer for later analysis.

different damage types are tested. Both defects simulate the spalling defect. In this example of the system, three stages of defects are established and tested: an initial defect stage, a middle defect stage, and a final defect stage. For the baseline condition and each stage of a defect, three different misalignment stages are determined and tested: 0°, 0.2°, and 0.4°. The 608 bearing has the maximum misalignment specification of 0.3°.

Figure 7:
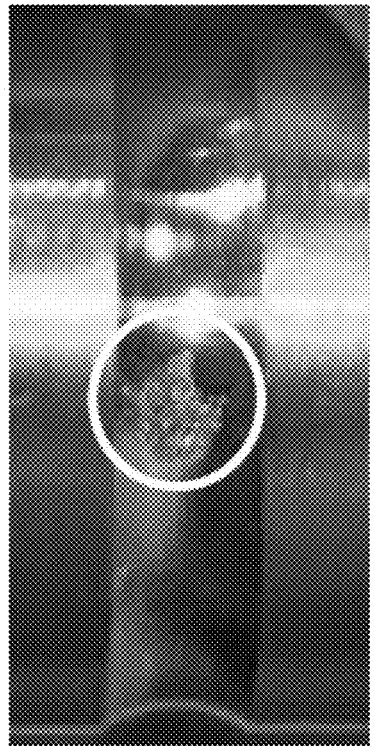
FIG. 7 is a photograph of a defect along an inner race of a bearing that can be used for testing failure to create a model.

Artificially induced defects can be created by hand using a tool and then measured under a microscope. The tool can reproduce the "flaking" damage by abrasively wearing down the surface. The initial defect size in one example is a 1 mm×1 mm area with 0.1 mm depth, as represented in FIG. 7. The mid-stage defect size increases the defect size to a 2 mm×2 mm area with a 0.2 mm depth. The final stage defect involved damaging the entire ring with a deeper depth of damage at the starting location of the defect (depth of damage—0.5 mm). The following Table 1 shows the different bearing tests conducted in three stages starting from the initial stage in tests 4-6, the mid-stage in tests 7-9, and a final failure stage in test 10-12.

TABLE 1

| Bearing Test | Type of Defect | Number of Defect | Size of Defect (L × W × D) (mm) | Percentage of Damage to Bearing Component | Degree Misalignment |
|---|---|---|---|---|---|
| 1 | None | 0 | NA | 0% | 0 degrees |
| 2 | None | 0 | NA | 0% | .2 degrees |
| 3 | None | 0 | NA | 0% | .4 degrees |
| 4 | Inner Race | 1 | 1 × 1 × .1 | 6% | 0 degrees |
| 5 | Inner Race | 1 | 1 × 1 × .1 | 6% | .2 degrees |
| 6 | Inner Race | 1 | 1 × 1 × .1 | 6% | .4 degrees |
| 7 | Inner Race | 3 | 2 × 2 × .2 | 33% | 0 degrees |
| 8 | Inner Race | 3 | 2 × 2 × .2 | 33% | .2 degrees |
| 9 | Inner Race | 3 | 2 × 2 × .2 | 33% | .4 degrees |
| 10 | Inner Race | Complete Bearing Destruction | Entire Bearing Surface | 100% | 0 degrees |
| 11 | Inner Race | Complete Bearing Destruction | Entire Bearing Surface | 100% | .2 degrees |
| 12 | Inner Race | Complete Bearing Destruction | Entire Bearing Surface | 100% | .4 degrees |
| 13 | Outer Race | 1 | 1 × 1 × .1 | 6% | 0 degrees |
| 14 | Outer Race | 1 | 1 × 1 × .1 | 6% | .2 degrees |
| 15 | Outer Race | 1 | 1 × 1 × .1 | 6% | .4 degrees |

Figure 6:
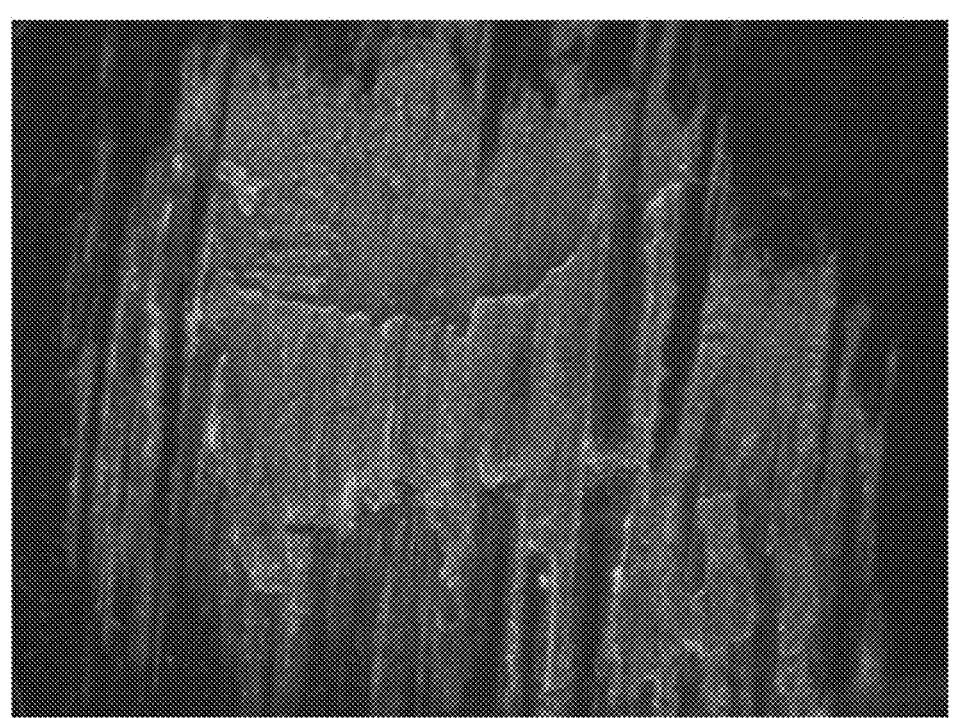
FIG. 6 is a magnified photograph of the bearing damage.

For testing, each artificially induced defect simulates the spalling damage, seen in FIG. 3, the initial case, and FIG. 4, the extreme case. Spalling is characterized as the pitting or "flaking" away of bearing material, detailed closely in FIG. 6. The primary causes for spalling typically range from contamination, misalignment, and excessive loading on the bearing resulting in fatigue failure. For this testing, physical means introduce damage over time. Several reasons contributed to the selection of a 608 style deep groove ball bearing for the illustrative case. The first reason is the accessibility of the bearing, making it easy to acquire large amounts of bearings at low cost for testing various types and stages of failures. The second is the simple disassembly for applying damage to the bearing in a modular manner. It does not require specialized hardware to damage the bearing and implement the bearing for testing. The third factor is the ability to replicate artificial damage in comparison to prior literature and prevalent use in industry from roller bearings. With the selected bearing, a baseline condition and two Tests 13-15 are for the initial defect stage of an outer race defect. Tests 1-3 are for the baseline case.

Bearing damage is typically seen as changing in order of magnitude, as observed by one study accounting for the change in damage for the different bearing tests.

$$\%_d = \frac{N * M_{cd}}{M_c} \tag{1}$$

Equation 1 calculates the percent damage, as seen in Table 1. $\%_d$ is the percent damage seen in the difference based on the mass of the bearing. N is the number of defects on the bearing. $M_{cd}$ is the lost mass of the bearing based on the density of the material and size of the defect. $M_c$ is the expected mass of the bearing when healthy. Each test runs for approximately a minute and generates a comparable amount of data as used to detect the failure seen in FIG. 3. This time interval provides sufficient data to calculate the bearing frequencies and determine the bearing defect. Tests that run for approximately a minute yielded at least three million samples. This setting remains constant under each misalignment and damage condition. In this example, a maximum of five tests is run in each scenario to ensure the repeatability of the results.

The system can include using a bandpass filter that is applied to focus on the bearing defect frequencies for frequency assessment. The bandpass filter can have a lower and upper limit of 60 Hz and 250 Hz, respectively, based on a prediction from the bearing defect frequency equations given in Equations 2-4.

$$BPFI = \frac{N_b}{2} * S * \left(1 + \frac{B_d}{P_d}\cos(\emptyset)\right) \quad (2)$$

$$BPFO = \frac{N_b}{2} * S * \left(1 - \frac{B_d}{P_d}\cos(\emptyset)\right) \quad (3)$$

$$FTF = \frac{N_b}{2} * S * \left(1 - \left(\frac{B_d}{P_d}\right)^2 * (\cos(\emptyset))^2\right) \quad (4)$$

A finite impulse response is used with the bandpass filter to compensate for any delay in the signal since the amount of data was at least twice the Nyquist frequency. After applying the bandpass filter, three test methods were used to assess the data. The first is the time-series assessment to observe any statistical observations. The nature of machine condition monitoring in the vibration shock handbook were referenced. As damage occurs in rolling elements, the variance of data should lower with a widening in the base for more data outliers. The mean should also have a higher peak and center at 0. These outliers should indicate the impulse motion (impulsivity) of the rolling element striking the bearing defect and the possibility of damage to the bearing. As damage increases, the amount of these outliers should increase.

After the time-series observations, the analysis assesses the data for statistical significance. Levene's test checks the variance of each test run for statistical significance in two types of tests. Based on Mechefske's observation, the variance should remain the same at a given defect size and misalignment test and change significantly between damage levels. Five tests provide enough different datasets to check for repeatability and consistency of the data. The three different damage states and baseline provide enough data to track bearing damage through the variances. The first statistical test is checking the repeatability of each bearing test, wherein the null hypothesis is that the runs for each bearing test for the same stage of damage and misalignment should have the same statistical characteristics. In this manner, the correct statistical response from the test is a failure to reject the null hypothesis. The second statistical test is in assessing the difference between the damage stages, wherein the null hypothesis is that the variance between damage states is the same. For this test, the expected result rejects the null hypothesis, meaning there is a difference in the damage of the data.

The next test can use a Fast Fourier Transform (FFT) to assess whether the defect frequencies of the inner race and outer race defects have changing peaks and through visual observation of sidebands. The three predictive equations for the failure defect frequencies are Equations 2-4, where the IRF is the inner race defect frequency, the ORF is the outer race defect frequency, and RF is the rolling element defect frequency. Nb is the number of rolling elements. S is the rotational speed. Bd is the ball diameter, Pd is the pitch diameter, and $\emptyset$ is the contact angle. As the defect size increases, the peak amplitude at the defect frequencies should begin to dominate the signal.

The final measure of analysis is using the envelope spectrum signal analysis after prewhitening the data. Prewhitening filters the data to behave like statistical white noise. The filter relies on the fact that all the spectral bands of the data have the same power spectral density. In this manner, the spectral bands with more impulsivity should dominate and show the impulsive responses of typical bearing failures. After the prewhitening of the data, envelope analysis quantifies these impacts. Envelope analysis can extract impacts with lower energy and other hidden vibration signals, making it a preferred alternative to FFT in some cases. This analysis method was used previously by one study resulting in a set of bearing data.

Figure 8:
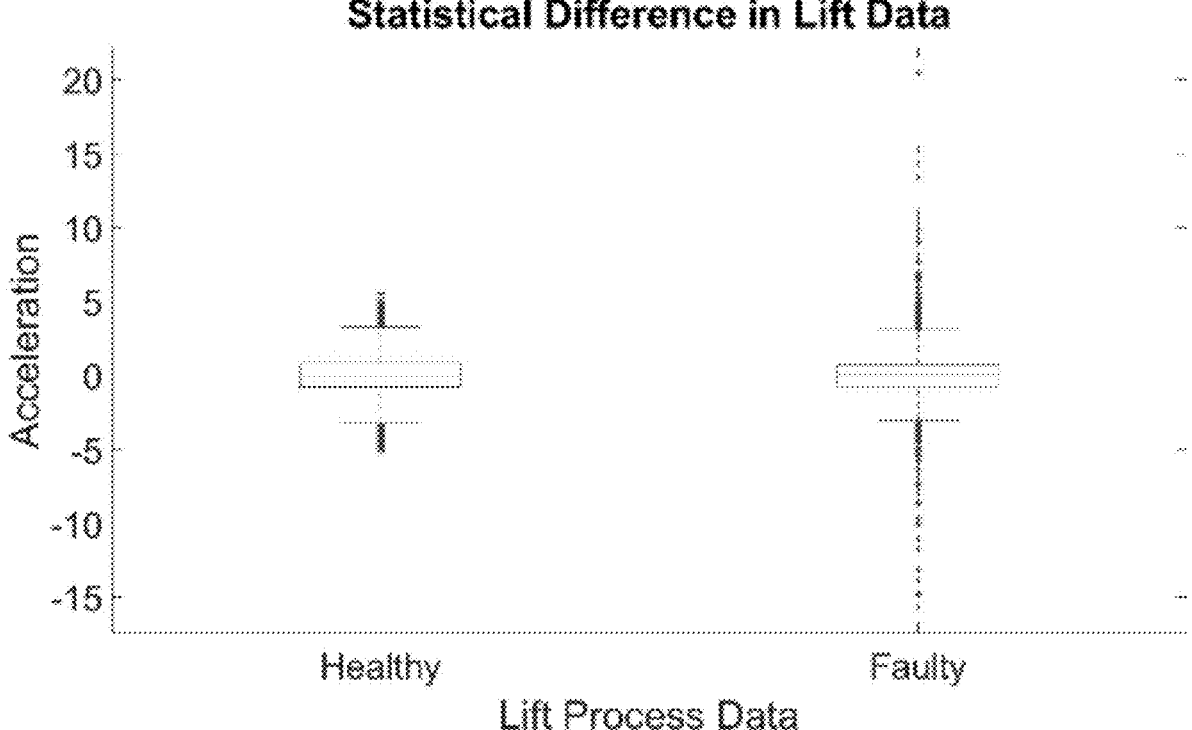
FIG. 8 is a chart showing the distribution of data and the statistical difference between healthy and faulty data taken from a vertical lift wherein as the defect size begins to increase, there is a decrease in the variance of the data.

Data, taken from a vertical car lift application, was tested to understand the expected changes in the data, from the healthy state to the fault state. FIG. 3 shows the damage state of the bearing at the time of recording. After the lift repair occurs, a second dataset was collected. Three collections tests ran for each dataset. The total number of samples, in each case, is 9 million samples, corresponding to approximately three minutes' worth of data. FIG. 8 shows the distribution of both datasets. The fault data has a higher range in the data compared to the healthy data. These observations fall in line with the expectations seen in Mechefske. Indication of a broader base of values and a higher peak at the mean denotes a possibility of a defect in the fault data.

Levene's Test tested the variances for statistical significance in each test run. For the repeatability test, the correct response should fail to reject the null hypothesis. For the difference in damage test, the test should reject the null hypothesis. For the data in FIG. 8, the first statistical test for repeatability failed to reject the null hypothesis with a p-value of 0.9, meaning each test run was statistically the same. The second test resulted in a p-value of 0, indicating a difference in the damage set. Each test had a 95% confidence interval associated with it.

Figure 9:
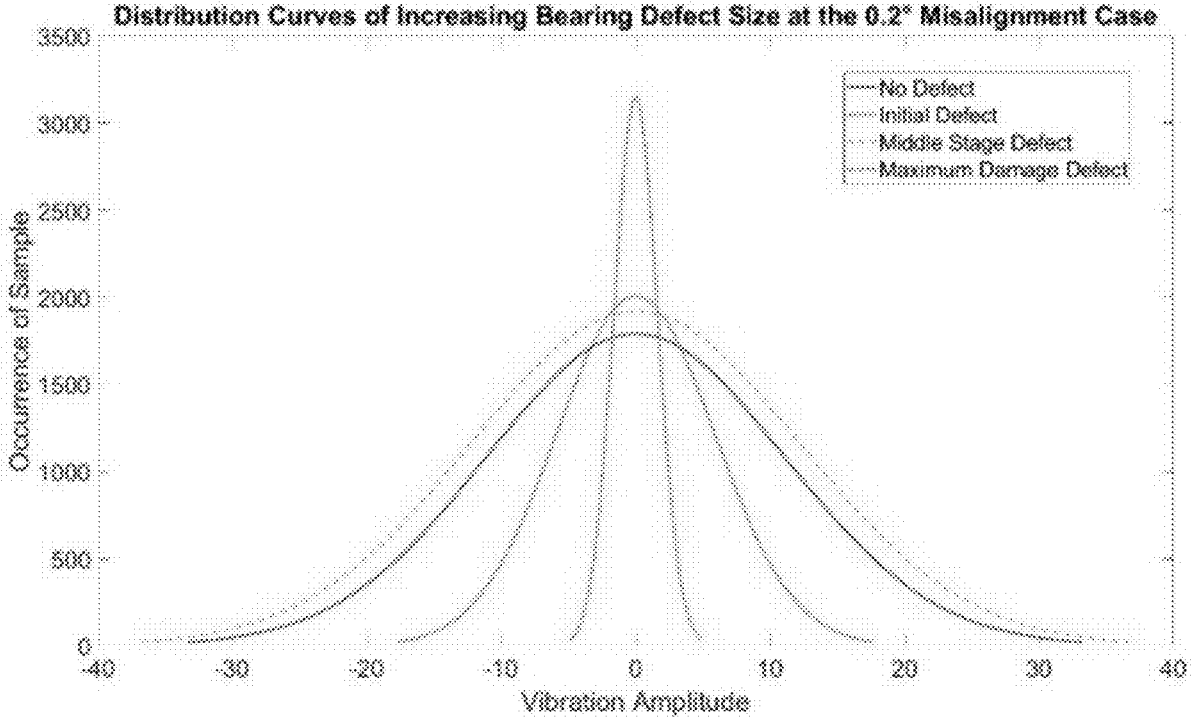
FIG. 9 is a chart showing a distribution that can tend toward low variance and high mean amplitude as failure approaches.

FIG. 9 shows the histogram of samples for the 0.2° misalignment case as the bearing defect increases in damage. Each curve fits a normal distribution. The baseline curve is denoted as the solid blue line, while the green dash-dotted line is the failure case of the bearing defect. The general shape of the distribution peak falls in line with the expectations stated in Mechefske, regarding the statistical analysis of rotating machinery defects and faults. However, there are a few characteristics that were observed to differ. The first is the base of each distribution. As the distribution base widens, the damage and the size of the defect should increase. However, the baseline case has the second widest range of values. The second differing observation is the change in the peak from the initial defect to the middle stage defect case. The peak mean decreased for the middle stage defect case. The expectation is that the peak mean increases and sharpens as it does for the initial defect and extreme defect case. Levene's Test assessed the generated artificial damage for the statistical significance using the same tests as performed for the actual use case.

TABLE 2

| | Baseline | Initial Defect | Middle Stage Defect | Late Stage Defect |
|---|---|---|---|---|
| 0° Misalignment | 3.02/0.75/— | 2.09/0.82/0.00 | 4.99/0.74/0.00 | 4.91/0.63/0.00 |
| 0.2° Misalignment | 11.131/0.83/— | 8.40/0.90/0.00 | 16.37/0.85/0.01 | 3.79/0.81/0.00 |
| 0.4° Misalignment | 10.6247/0.63/— | 9.41/0.82/0.00 | 11.38/0.84/0.00 | 8.37/0.5/0.00 |

Table 2 shows the p-values between the damage stages as they increase. The first value in each column is the average variance between test runs. The second number is the p-value associated with Levene's Test for the first statistical test for test run repeatability. The third value is the p-value associated with Levene's Test for the difference in damage.

TABLE 3

| | $1^{st}$ Peek | $2^{nd}$ Peak | $3^{rd}$ Peak |
|---|---|---|---|
| Expected | 115 Hz | 154 Hz | 204 Hz |
| Baseline | 101 Hz | 152 Hz | 203 Hz |
| Initial Defect | 101 Hz | 152 Hz | 204 Hz |
| Middle Stage Defect | 100 Hz | 161 Hz | 201 Hz |
| Lat Stage Defect | 102 Hz | 152 Hz | 204 Hz |

Figure 10:
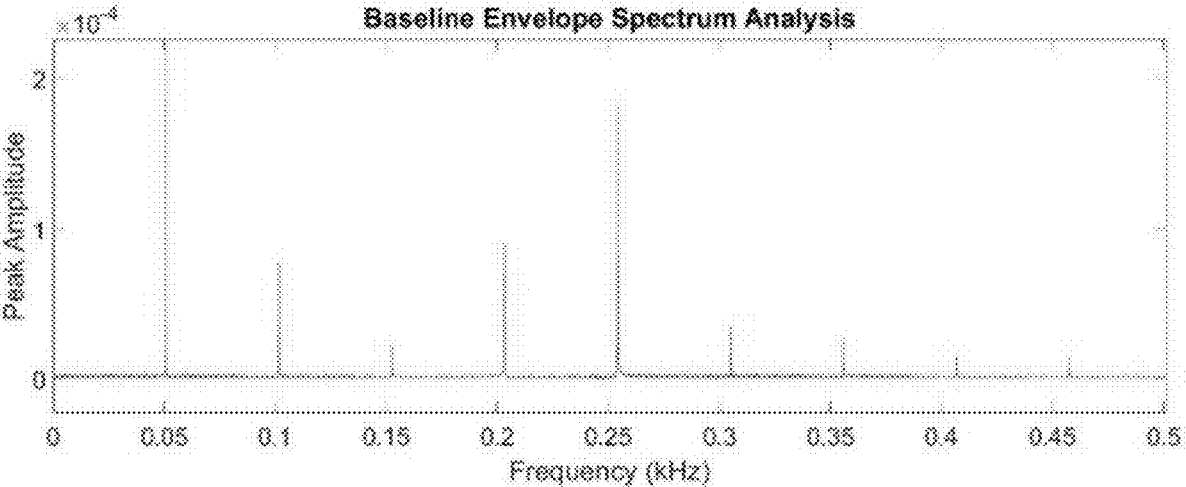
FIG. 10 is a chart showing envelope analysis showing peak amplitude at the corresponding significant frequencies of the analysis.

From the time series and statistical observations in Table 2, frequency analysis using an FFT assessed the data for the 0.2° misalignment case. The FFT was applied to the data after it was passed through a bandpass filter, as described herein. The computed expected peaks of the 608 bearings are 204 Hz for the inner race defect frequency, 115 Hz for the outer race defect frequency, and 154 Hz for the rolling element defect frequency. Table 3 shows the results of the FFT for the three highest peaks. While the data began with the correct peaks at the initial defect stage, the peak amplitude for the FFT occurred at the $1^{st}$ peak, corresponding to the outer race consistently. Using the FFT, an acceptable bandwidth limit was established for each damage level to track the damage. For the baseline case, the acceptable bandwidth limit was 152 Hz. In the initial inner race defect case, this rose to 212 Hz. For the middle damage case, this increased to 267 Hz, and in the extreme damage case, the limit rose to 332 Hz. As damage increased, the acceptable bandwidth limit rose as well. Evaluation of bearing data can use a method of prewhitening the data and then performing an envelope spectrum analysis. FIG. 10-13 shows the resulting envelope spectrum analysis for the 0.2° misalignment case at each different damage level. FIG. 10 shows the baseline case using the envelope spectrum analysis. The highest peak of the data are observed at 50 Hz, corresponding to the expected frequency output of the motor. The 250 Hz frequency peak represents the motor frequency output as well. The frequency peaks at 101 Hz, 152 Hz, and 203 Hz also likely have some mixture of the motor frequency as well. These additional peaks could account for the wide variation seen in the sample bases of the baseline distribution in FIG. 8. Picking up the motor vibrations could lead to a broader range of signals and a higher variation in the data.

Figure 11:
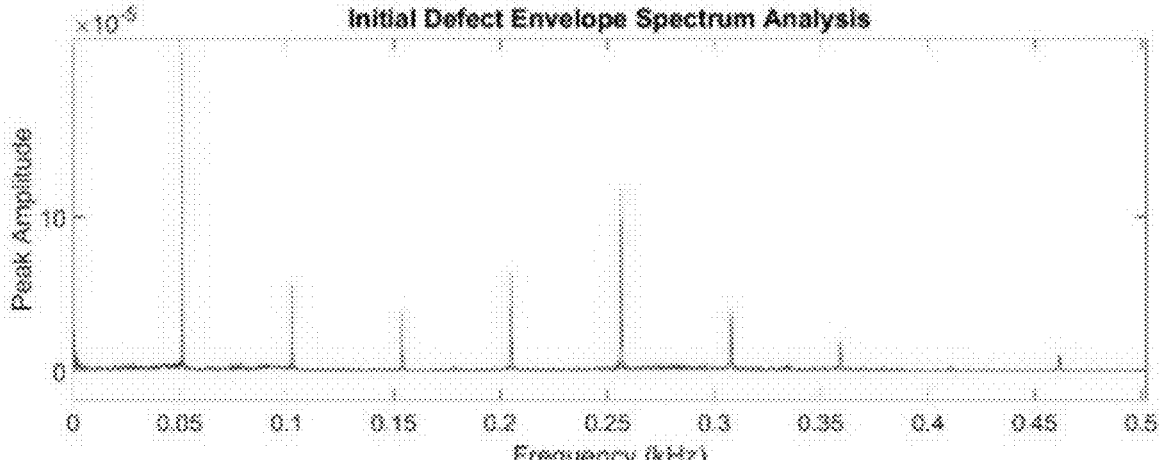
FIG. 11 is a chart showing envelope analysis displaying the peak amplitude at the corresponding significant frequencies of the analysis for the initial case.

FIG. 11 shows the initial defect case using the envelope spectrum analysis. The signal had more attributed sidebands and saw a brief reduction in the peak of the data as compared to the peaks seen in FIG. 10. These are the common indicators of a defect introduced. However, the peak amplitude occurred at again 50 Hz with the secondary amplitude occurring at 250 Hz. The tertiary peak was at 204 Hz, the defect frequency of the inner race.

Figure 12:
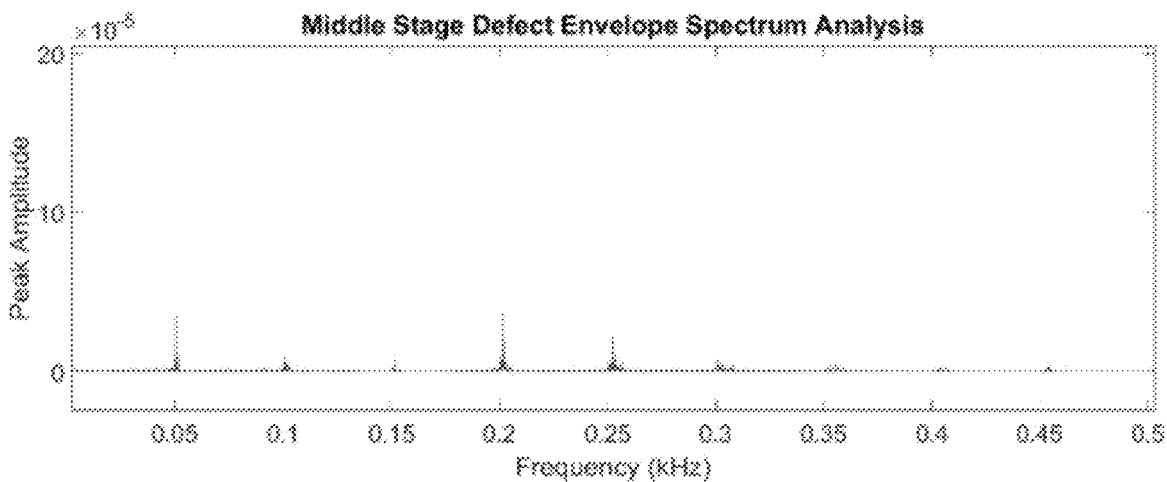
FIG. 12 is a chart showing envelope analysis displaying the peak amplitude at the corresponding significant frequencies of the analysis for the initial case.

FIG. 12 shows the middle stage defect case using the envelope spectrum analysis. Sidebands appear more prominently around the defect frequencies and the motor frequencies. The peak amplitude at the inner race defect frequency is the highest. However, the peak location is at 201 Hz versus 204 Hz, the expected defect frequency. There is the formation of additional sidebands, which could lead to higher peak amplitudes at the expected location. While correct, in appearance, this is a deviation to what was observed previously in FIG. 11 and next in FIG. 13.

Figure 13:
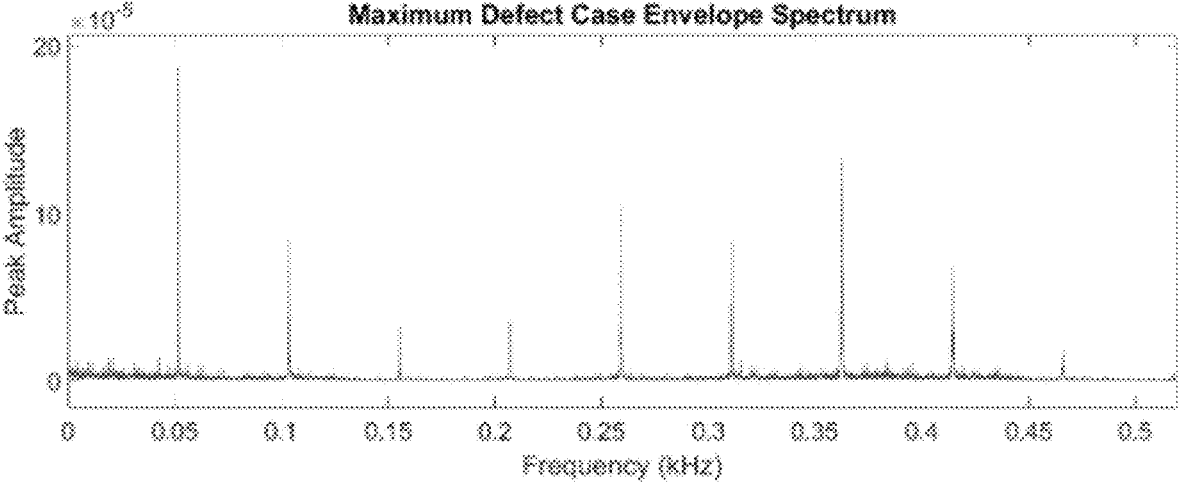
FIG. 13 is a chart showing envelope analysis displays the peak amplitude at the corresponding significant frequencies of the analysis for the initial case.

FIG. 13 shows the maximum stage defect case using the envelope spectrum analysis. The sidebands appear around the peak amplitudes. Here as the defect case size has increased, however, the motor frequencies are again the highest expected frequencies. The inner race bearing defect frequency is now at 204 Hz denoted by the peak but is not the peak amplitude. Out of the three bearing frequencies, the outer race frequency is now the strongest. While the FFT did yield the correct defect frequencies with the bandpass data, the envelope spectrum analysis shows possible deviations are coming from the motor as well. These deviations could come from unaccounted for vibrations attributed to possible mechanical looseness when reassembling the motor and fitting in the damaged bearing. Another possible element is the shaft misalignment, causing more impulsivity on the bearing.

Figure 14:
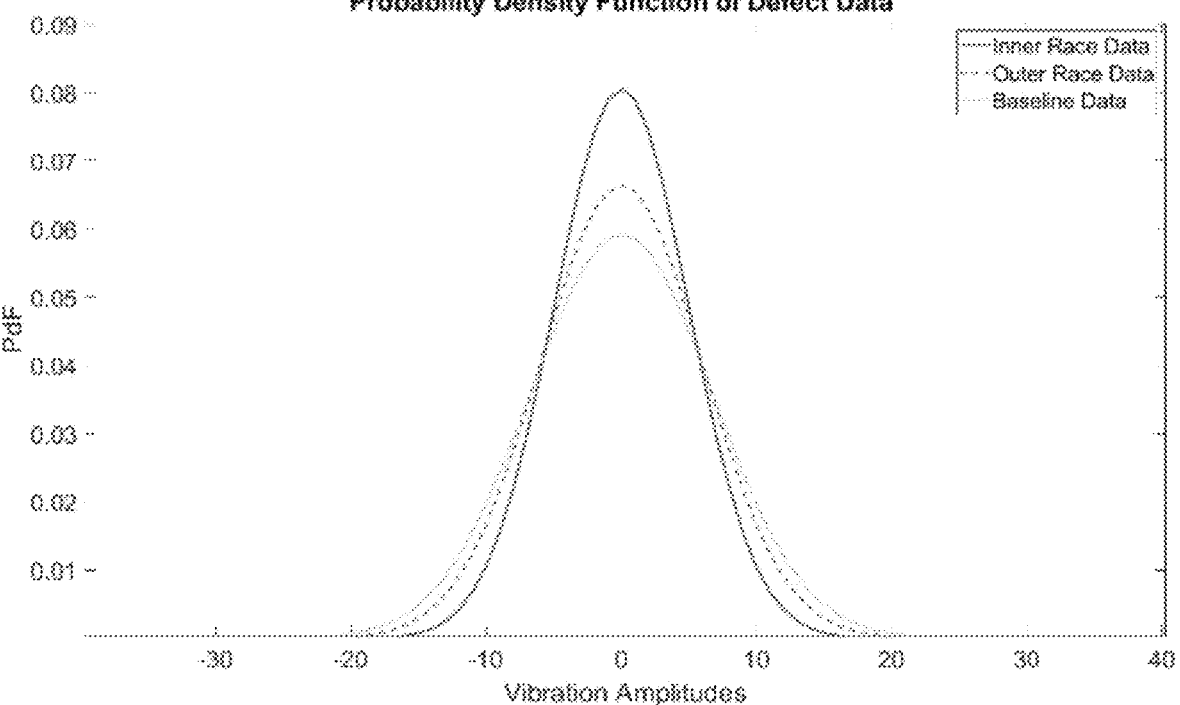
FIG. 14 is a chart showing curves representing a different respective distribution of samples wherein each curve comes from the initial damage 0.2° misalignment case for the baseline case, the inner race defect case, and the outer race defect case.

Tests 13-15 from Table 1 are the initial bearing damage case on the outer ring. FIG. 14 shows the difference in the distribution of data for each defect in comparison to the baseline data. The solid line and dashed lines are the inner race and outer race frequencies, respectively. The dotted line is the bearing baseline data. There was a sharper peak at the mean point for each defect dataset than the baseline set. However, there was a broader range in base values for the baseline data than the defect frequency data. The outer race bearing was statistically differentiable to the baseline case with a p-value of 0.01. However, it was not statistically differentiable from the inner race-defect case with a p-value of 0.53. This result happens potentially, due to the early stage of the defect or the added element in misalignment, as previously mentioned.

As a synthesis of the results, the generated bearing data had mixed results in terms of analysis. One study provides examples related to roller element bearing faults in both the time and the frequency spectrum. One of the establishments from this prior work was the change in the distribution of data samples, as mentioned earlier in the results section. This distribution change appeared in the inner race defect and the outer race defect for the normal distribution case. As the damage increased, the shape of the distribution began to change. A higher range of vibration samples and an increasing higher mean amplitude at 0 $m/s^2$ with some peak variation denoted an increase in damage for each test case. The misalignment smoothed the distribution curve and reduced the peak amplitude, accounting for some of the deviations from Mechefske's examples seen in the middle stage defect case. Despite inconsistencies observed, there was a measurable statistical differentiation in the variances for both the repeatability and difference in damage levels.

For the frequency spectrum analysis, the FFT computed the frequency transform for each damage stage of the 0.2° misalignment case. The bearing frequencies peaked within the bandpass filter range. With the frequency results, an overall increase in damage is observed by setting the acceptable bandwidth of the FFT. The baseline limit was calculated by integrating the area underneath the length of the FFT curve for each stage. The increase in bandwidth limit coincides with the increase in damage, another measure observed by Mechefske. With the frequency data, the increase in defect size and damage was trackable using these bandwidth limits. However, prewhitening the data and subsequent envelope spectrum analysis, revealed the appearance of higher motor frequencies that drowned out the bearing defect frequencies.

In conclusion, that while the bearing data did follow the statistical expectations, it is possible through the misalignment and changing out the bearings, additional vibrations were introduced. An outer race defect case was presented in comparison to the inner race defect and baseline case using time series statistical measures. The outer race defect followed the same established motion as the defect data had a higher peak mean and lower variance than the healthy data. However, Levene's Test, testing the variances of the defect datasets at the initial damage level, could not differentiate between the inner race and outer race defect. The damage was deemed as trackable using two different methods: variance of the time series data and the bandwidth limits in the frequency spectrum data. Through the statistical significance in Levene's Test, the variance is different based on the stage of the defect and the misalignment induced. There is an exponential progression of the damage for the 0.2° and 0.4° misalignment cases from the baseline, initial, and final defect cases. These values can correspond to then the different percentages of bearing failures. This system generates training data to create predictive failure classifiers for manufacturing equipment. A test bench systematically mimics contamination damage seen with pitting and brinelling, which in the severe case turns into spalling damage in bearings. Three bearing cases are tested: a baseline, an inner race defect, and an outer race defect. Three different stages of failure are tested for the inner race defect: the initial, middle, and final stage case. For the outer race defect, an initial stage defect is induced and tested. Each stage of bearing damage is assigned a percentage of damage based on the mass of the bearing component compared to a healthy component of the bearing. Three different types of misalignment were measured: 0° misalignment, 0.2° misalignment, and 0.4° misalignment. The misalignment increases the impulsivity of the bearing defect.

Levene's Test determines the statistical significance of the data. Two hypotheses are tested for statistical significance; the first is the repeatability of test runs within each Table 1 test, and the second is the differentiation of damage between each stage of failure. The data distributions were compared based on raw and frequency values to time series findings in Mechefske, FFT analysis, and using the prewhitening envelope spectrum analysis. The time-space values corresponded to findings in the literature, relative to the change of distribution of data as defects progressed.

In the FFT analysis, the data detected peaks for the bearing defect frequencies of the inner race defect. The damage is trackable using the frequency bandwidth limits of the bearing peaks. These limits increased as the defect size increased. While the defect and cause of the defect were indistinguishable based on the FFT and envelope spectrum analysis, the damage was trackable by placing bandwidth limits.

Figure 15A:
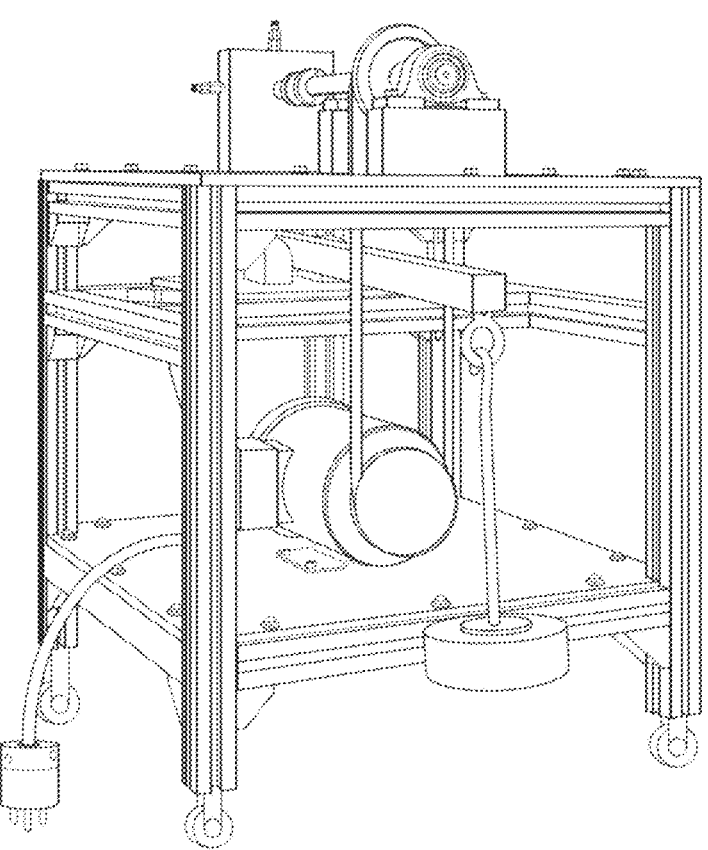
FIG. 15A is a picture of a secondary bearing test stand incorporating variable operating conditions and failure modes for generating damage data

Additional bearing testing has demonstrated the need for additional failure data for other failure modes using larger systems. FIG. 15A shows a separate bearing test stand to demonstrate additional failure modes under different operating conditions. The bearing tests are conducted using a motor-driven system connected to a pulley. The motor is rated at 1 horsepower at 1760 RPM. It is supplied by three-phase 240 AC. The pulley-driven system is supported by two mounted bearings that are not under test. The driven system connects to a secondary shaft, termed the test shaft. The defective bearing is mounted on the test shaft with a press fit and placed in an adaptable block to secure it during testing. The bearings have an applied load below the block using a lever and weights. This provides a variable change of load that is useful in simulating different operating conditions.

Figure 15B:
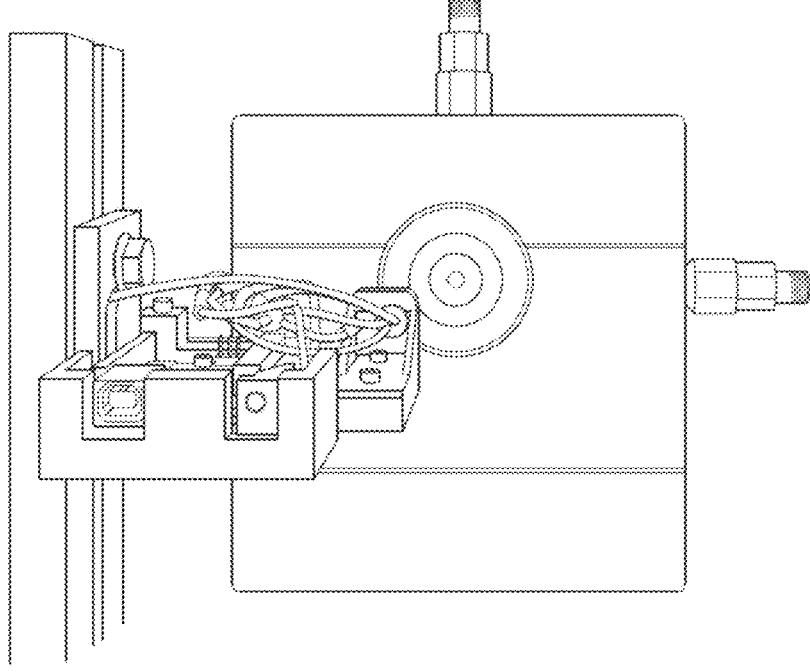
FIG. 15B is a picture of an adaptable block surrounded by different sensors to increase the amount of data generated.
Figure 16A:
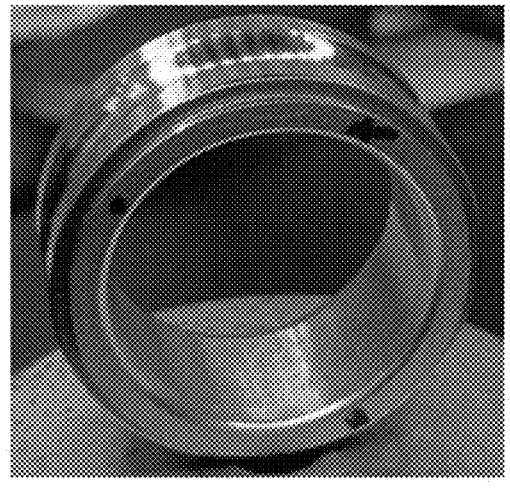
FIGS. 16A through 16D represent the brinelling data generated by dropping the bearing.
Figure 16B:
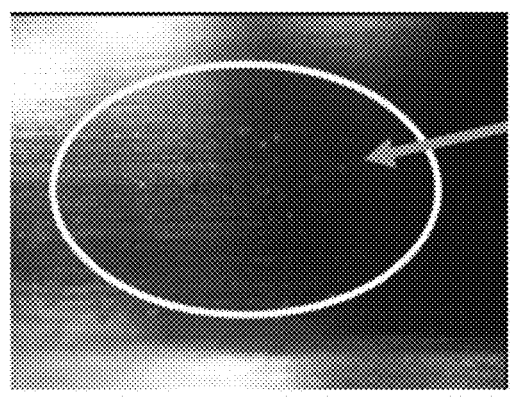
Figure 16C:
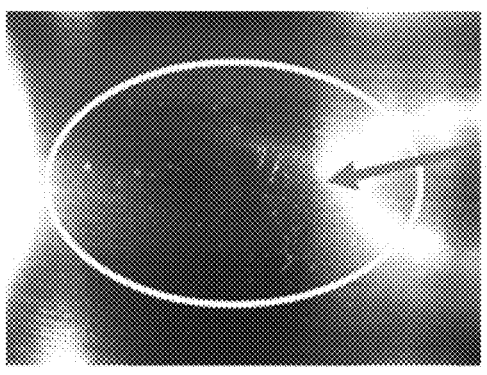
Figure 16D:
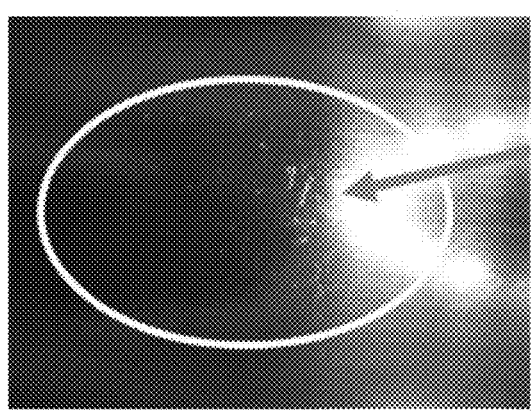

FIG. 15B shows the adaptable test block with a test bearing loaded attached. The adaptable block is changeable based on the bearing size and the sensors used. Two IFM vibration sensors are used in a horizontal and vertical configuration. The same sensors are used as described in paragraph [0055]. Additionally, two other sensors are used to corroborate and verify bearing damage. The first sensor is a temperature sensor shown in FIG. 15B as being placed in line with the bearing. This sensor monitors temperature fluctuations that appear for the bearing as friction increases. The second sensor is an acoustic sensor to corroborate the vibration readings from the IFM sensors. These sensor data are collected using an offline computer and a data acquisition system (DAQ).

For this example, three different bearing sizes are tested—6205, 6206, and 6207. Three different failure modes are tested of brinelling, fatigue, and contamination. Brinelling occurs during bearing manufacturing and installation by improper fitting, assembly operations, and installation practices. It occurs when tiny indentations are formed on the bearing raceway. The fatigue damage is created using an engraving tool on the bearing surface to create small defects resembling spalling. The contamination damage is created by mixing bearing lubrication with particles found in surrounding bearing applications.

Table 5 shows an example of the bearing damage data created over the three different damage types with different operating conditions for the 6205 bearing as an example for the data generation that could occur. The manner of testing occurred by selecting the operating conditions and then the damage stage. The contamination stages were measured based on the amount of particles added to a fixed amount of grease. The brinelling damage stages were measured by the drop height of the bearing to induce indentations. The engraving stage was a measure of percentage of the total bearing surface area damaged.

TABLE 5

| Failure Mode | Contamination | Brinelling | Engraving |
|---|---|---|---|
| Data Description | Operating Conditions: 640 RPM, 1103 RPM, 1687 RPM 533N, 814N, 1049N | Operating Conditions: 640 RPM, 1103 RPM, 1687 RPM 533N, 814N, 1049N | Operating Conditions: 640 RPM, 1103 RPM, 1687 RPM 533N, 814N, 1049N |

TABLE 5-continued

| | Damage States: 0.001 g, 0.01 g, 0.1 g, 1 g* *1 g was collected only at 533N RPM | Damage States: 0.5 m, 1.0 m, 1.5 m, 2.0 m | Damage States: 0.5%, 2.0% |
|---|---|---|---|
| Total Data Classes | 30 data classes - a combination of load, speed, and failure stage | 36 data classes - a combination of load, speed, and failure stage | 18 data classes - a combination of load, speed, and failure stage |

Figure 17A:
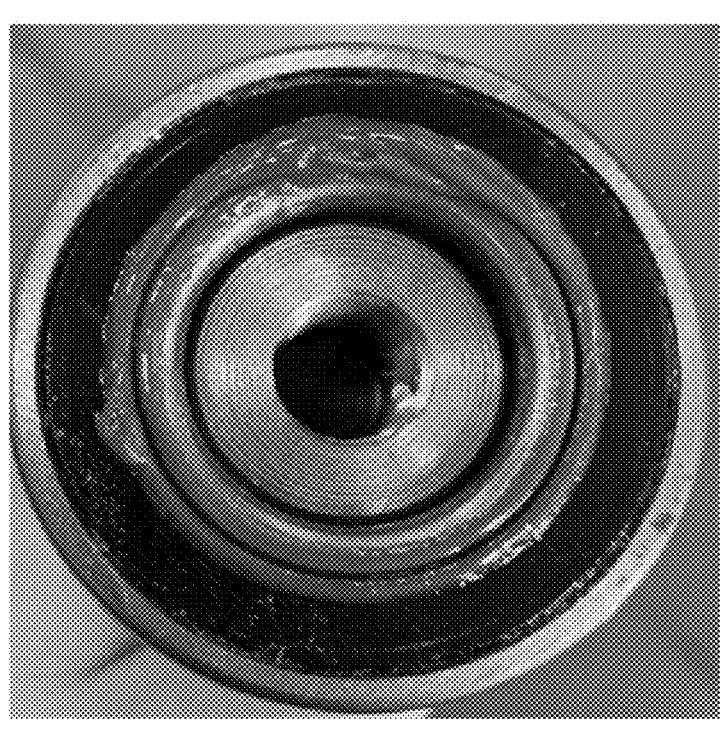
FIGS. 17A and 17B represent the change in lubrication seen during the contamination testing.
Figure 17B:
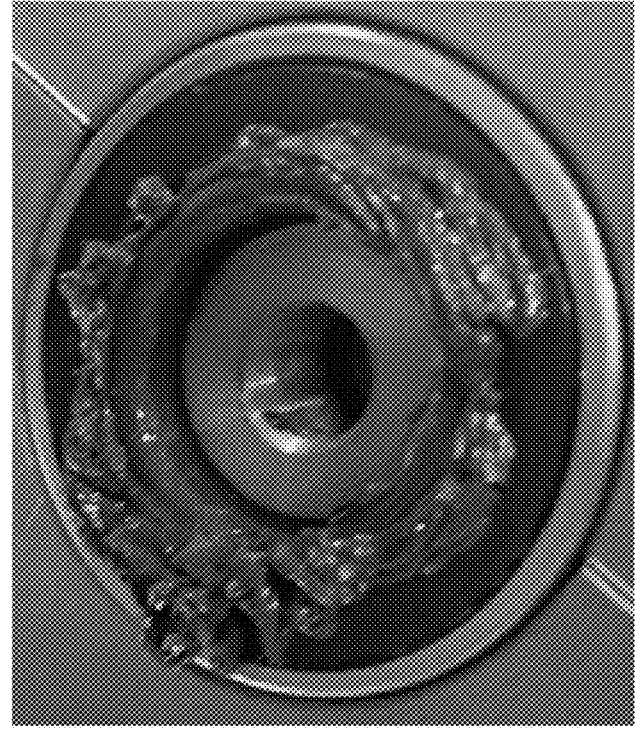
Figure 18:
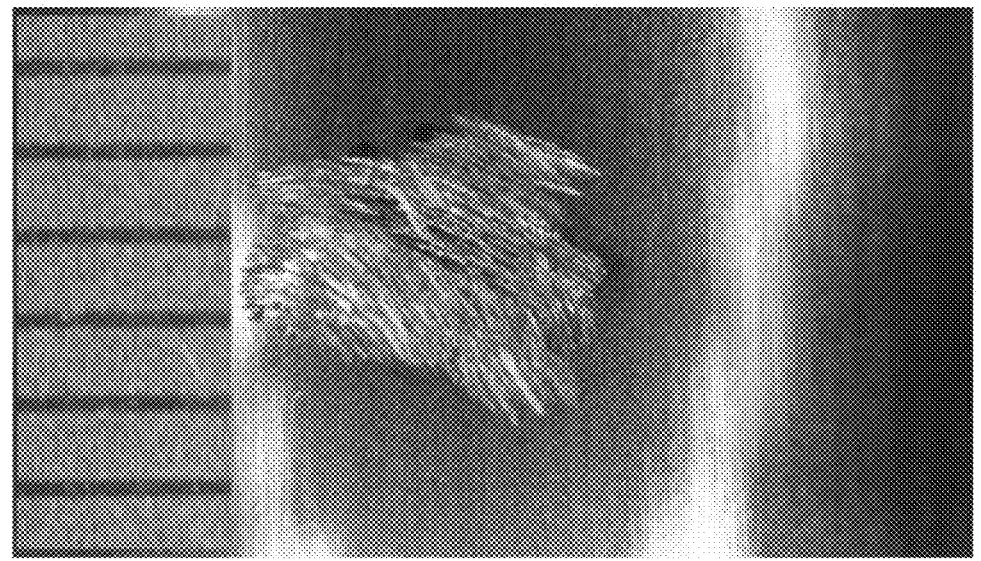
FIG. 18 represents the bearing damage induced during the fatigue testing.

FIGS. 16A through 16D show the microindentations created by dropping the bearings to demonstrate potential brinelling. FIGS. 17A and 17B show the grease migration and discoloration that occurs based on the inclusion of the bearing particles. An initial failure is shown in 17A and progressive failure is shown in 17B. FIG. 18 shows the engraving bearing defect meant to resemble fatigue. As evident from the images, different failure modes have different characteristics, highlighting the need for more diverse failure representation for bearings.

Figures 19, 20:
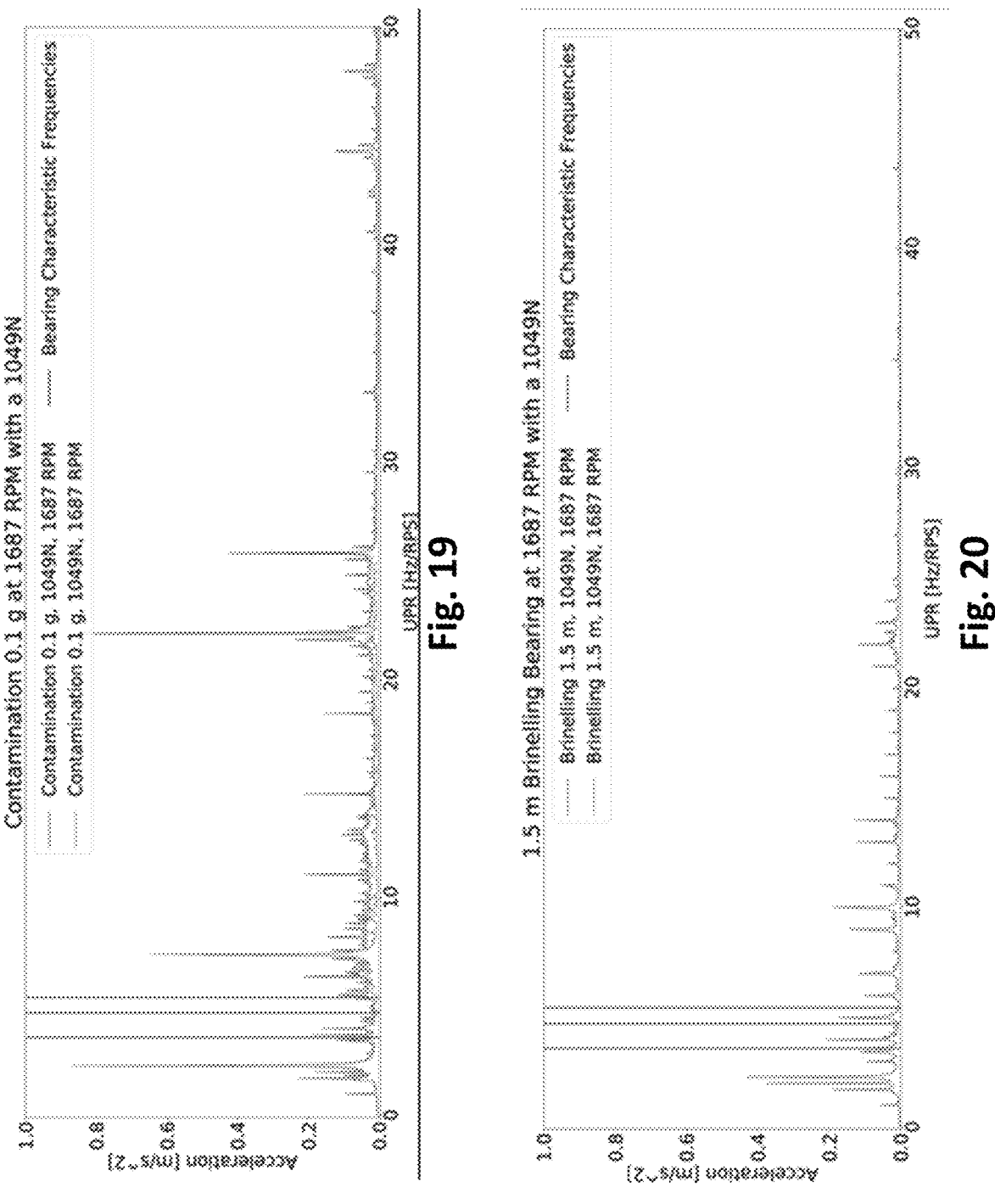
FIG. 19 represents the frequency response from contamination testing.
FIG. 20 represents the frequency response from the brinelling bearing.
Figures 21, 22A:
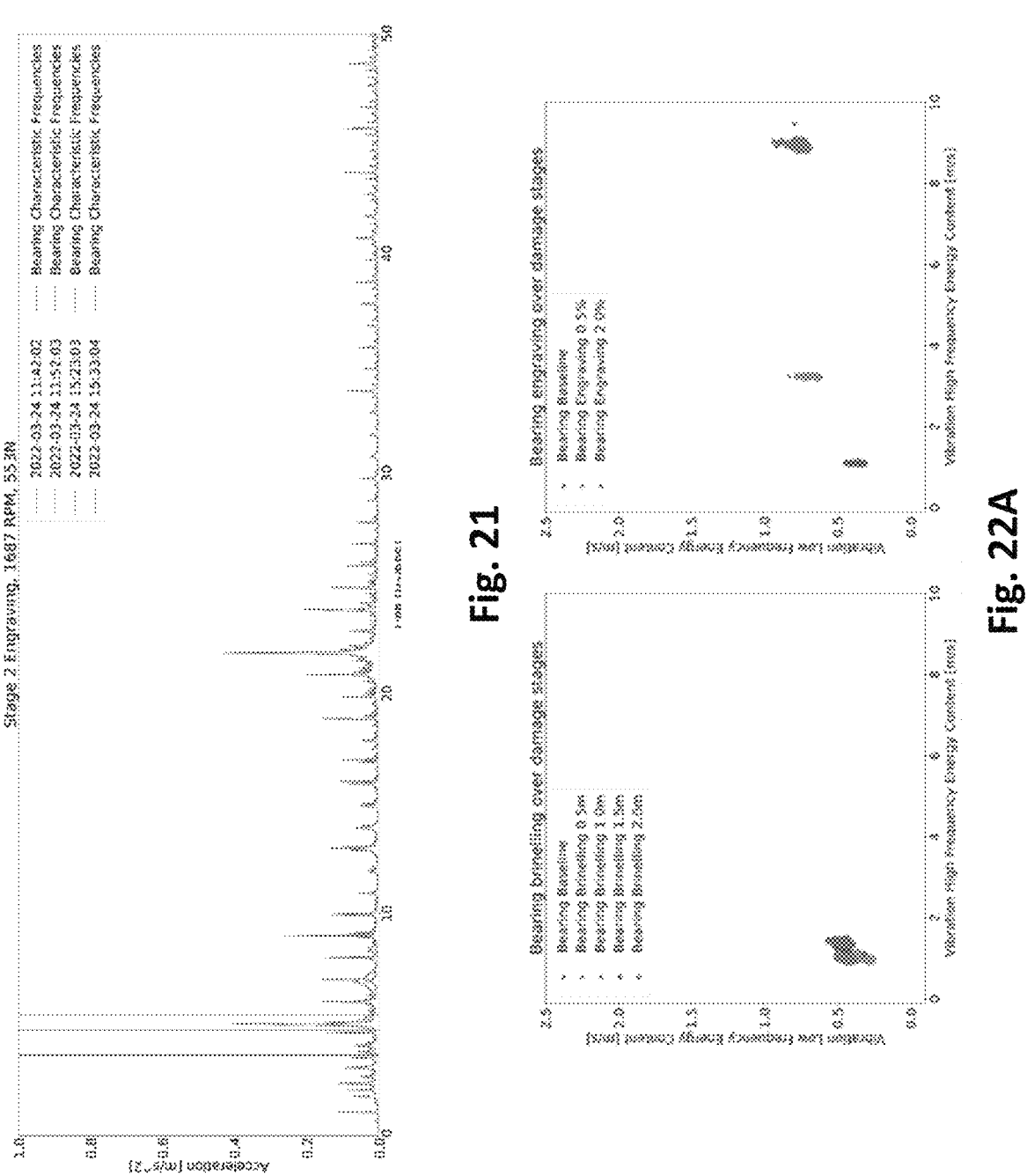
FIG. 21 represents the frequency response from the fatigue testing of the bearing.
FIGS. 22A and 22B show the damage progression through the course of testing for one particular set of operating conditions.
Figure 22B:
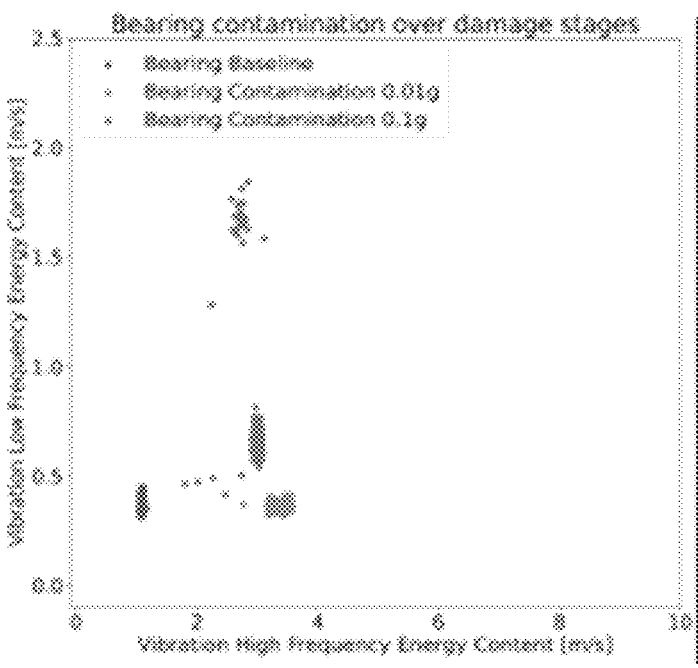

FIG. 19 shows the frequency representation for the contamination data. FIG. 20 shows the frequency representation for the brinelling data. FIG. 21 shows the frequency representation for the engraving data. Based on the bearing frequency plots, there are different characteristics frequencies identified with each particular frequency response. If these subsequent additional frequencies are not monitored, then it is possible to misdiagnosis and implement the wrong manufacturing solution. Additionally, as shown in FIGS. 22A and 22B, there are different failure mode progressions across each bearing damage state. These figures illustrate the brinelling damage progression, the fatigue/engraving damage progression and the bearing contamination progression.

Figure 23:
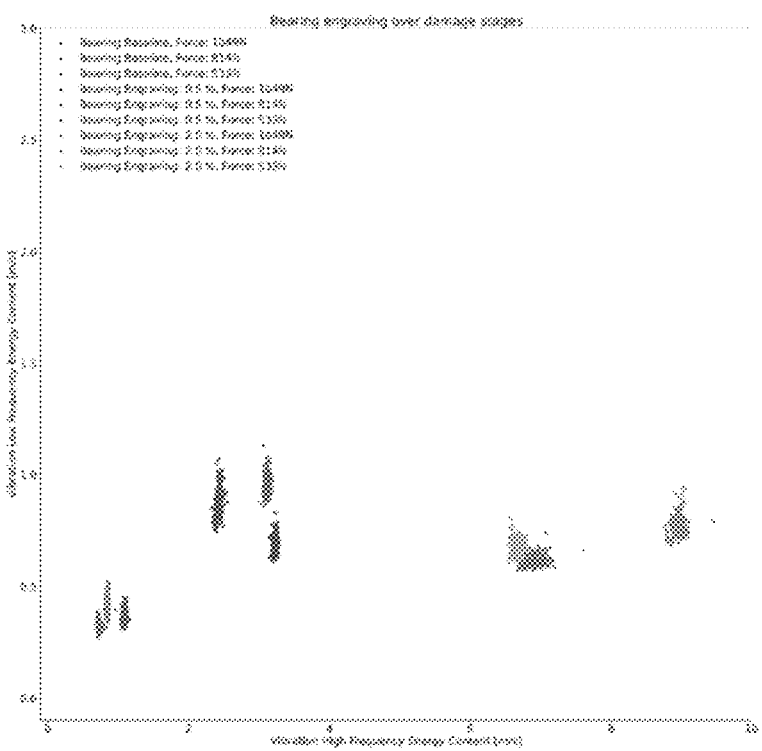
FIG. 23 shows the damage progression with the breakdown of signal response when considering different loads at each stage.

The brinelling case does not see a large change in damage suggesting that the damage mode takes far longer to progress with these smaller indentations. However, the contamination and engraving failure modes have a much broader jump as damage increases. This observation suggests that multiple different prognostic models are needed to ensure a robust prediction for bearing health, rather than relying on data from one failure mode to represent the potential failure from all failure causes. Additionally, FIG. 23 represents how the change in operating conditions occurs during the bearing lifetime progression.

Other bearings, such as those with cylindrical rolling elements, would require study to see if they follow the same statistical and frequency phenomena as rolling bearings. A rigid system is used to minimize the influence of outside environmental factors. Another item is the method validation for other critical components in manufacturing, and particularly components that rotate in use, such as CNC spindles, gears, and shafts, but also bolts and actuators, by way of example.

Figure 24:
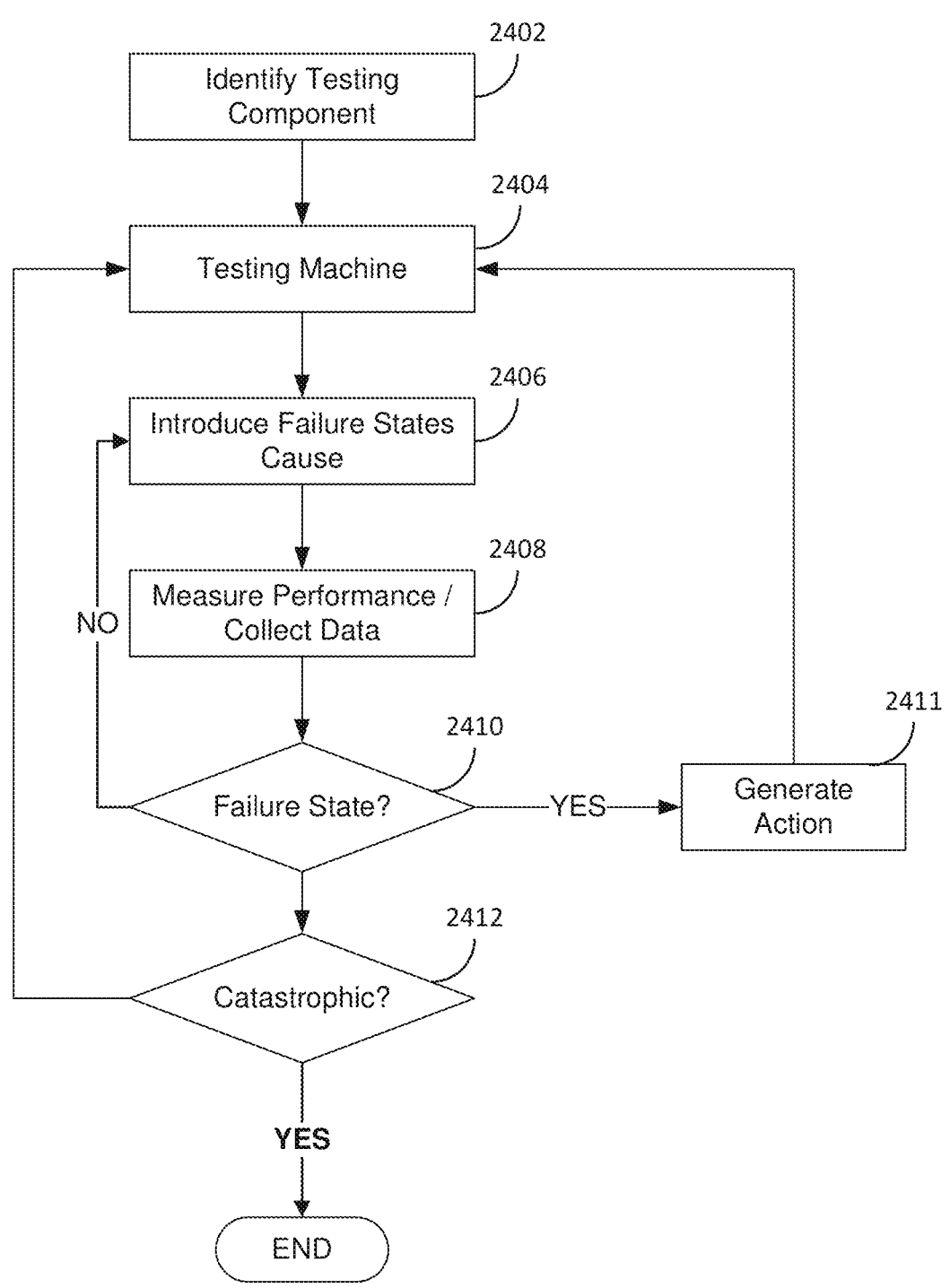
FIG. 24 is a flowchart illustrating a basic process of an embodiment of the invention.

Referring to FIG. 24, one embodiment of the system will be shown in further detail. The system and process for using the system can include the identification of an operational component in a machine that is the target for analysis and where predictive analytics to determine failure states of the operational component would be advantageous. The operational component, once identified, can be used to determine the operating environment and past performance of the operational component. Using the operating environment and past performance of the target operational component. A testing component can be identified at 2402. According to the operating environment and past performance (e.g., operational characteristics) of the operational component, a testing plan can be received or created for inducing a defect in the testing component. In one embodiment, the testing complement is a scale representation of the operation complement where in the ration of the testing complement to the operation complement is X:Y where X<Y in in one or more dimensions.

Once the testing complement is identified, the testing machine is applied to testing component 2404. The testing complement is then actuated to model its performance. For example, if the testing complement is a bearing, the testing machine rotates the bearing; if the testing complement is a spindle, the testing machine rotates the spindle under different loads; if the testing complement is a drill bit, the testing machine rotates the drill bit against different materials; if the testing complement is a joint, the testing machine actuates the joint from a first position to a second position that can be under difference loads, and the like. During testing, a failure states cause can be introduced at 2406 that can be taken from the group consisting of contamination, lubricate, lack of lubricate, physical damage, load, vibrations, friction, pressures, and any combination thereof. The failure state cause can be taken from the operational characteristics of the operational component. For example, in CNC machines, spindle failure can be caused by fretting, poor storage and handling, contamination, overload, incorrect preload, imbalance, and drawbar mechanism failure and the like. Prior to failure, a spindle can produce unusual noises, excessive vibration, generate excessive heat and any combination. Therefore, the testing machines actuates the testing component, introduces causes of failure actuates the testing component. The testing machines can also determine failure states that are reached due to the operational time of the testing component.

In one embodiment, the testing machine can measure performance characteristics of the testing complement while the testing component is being actuated. For example, if the testing component is a joint, the testing machines can actuate the joint, introduce a cause of failure, and detect vibration emanating from the joint. The vibration levels can rise as the testing component approaches one or more failure states. In one example, the higher the vibration level when accurate, the closer the testing component is to not just a failure state, but to catastrophic failure. Catastrophic failure can mean that the testing component fails in a manner where there is no recovery. Determining the change failure indicators, noise, temperature, vibrations, and the like prior to a failure states, including, catastrophic failure is determined by matching the failure indicator with the testing component failure state. In one embodiment, the operational characteristics of the testing component can be determined through sensors such as temperature sensor, microphone, cameras, vibration sensors and any combination. The information that is measured from the testing sensor can be used to generates a failure dataset that can represent the failure state of the testing complaint as causes of failure and actuation of the testing component.

When a cause of failure is introduced, the testing component is analyzed and a determination at 2410 can be made if the testing component has reached a failure state. If not, the process can return to 2406 and an additional failure cause of the same cause of failure can be introduced or even a different failure cause can be introduced. Once the testing component reaches catastrophic failure at 2412, the testing process can end. The testing process can be ended prior to catastrophic as well.

Once the testing process is completed, a dataset of the failure states and condition that caused the failure state can be used to create the failure dataset. The failure dataset can then be applied to the operation characteristic of the operation component.

Knowing the physical attributes of the operational components, the correlating operational performance can be calculated representing when the operational component approaches a failure state. When the failure state is reached, the system can provide notification that the operational component may be nearing a failure state and remedial actions can be taken prior to the operational component hitting or passing the failure state.

In one embodiment, the testing complement is a digital representation of the operational component. In this embodiment, the digital testing component is created using the physical characteristics of the operations component.

In one embodiment, the system can receive information concerning the actual failure states of the operational component. The system can compare the actual failure state with the failure dataset. In the event that the failure dataset predicts a failure state that is past the actual failure state of the operational component, the system (computer readable instructions) can modify the dataset according to the actual failure state for subsequent use in predictive failure states.

Figure 25A:
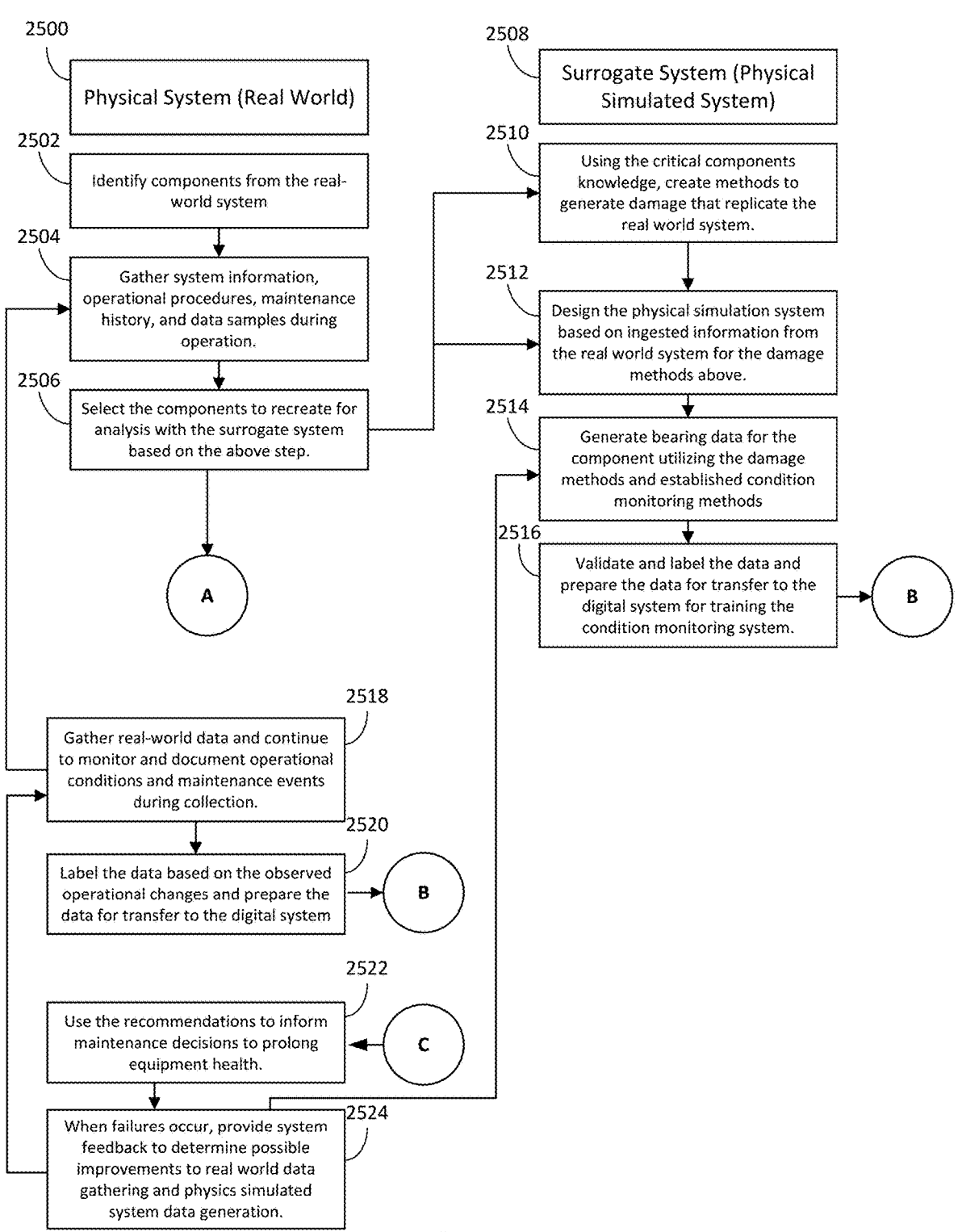
FIG. 25A is a flow chart showing the operation of aspects of the system.
Figure 25B:
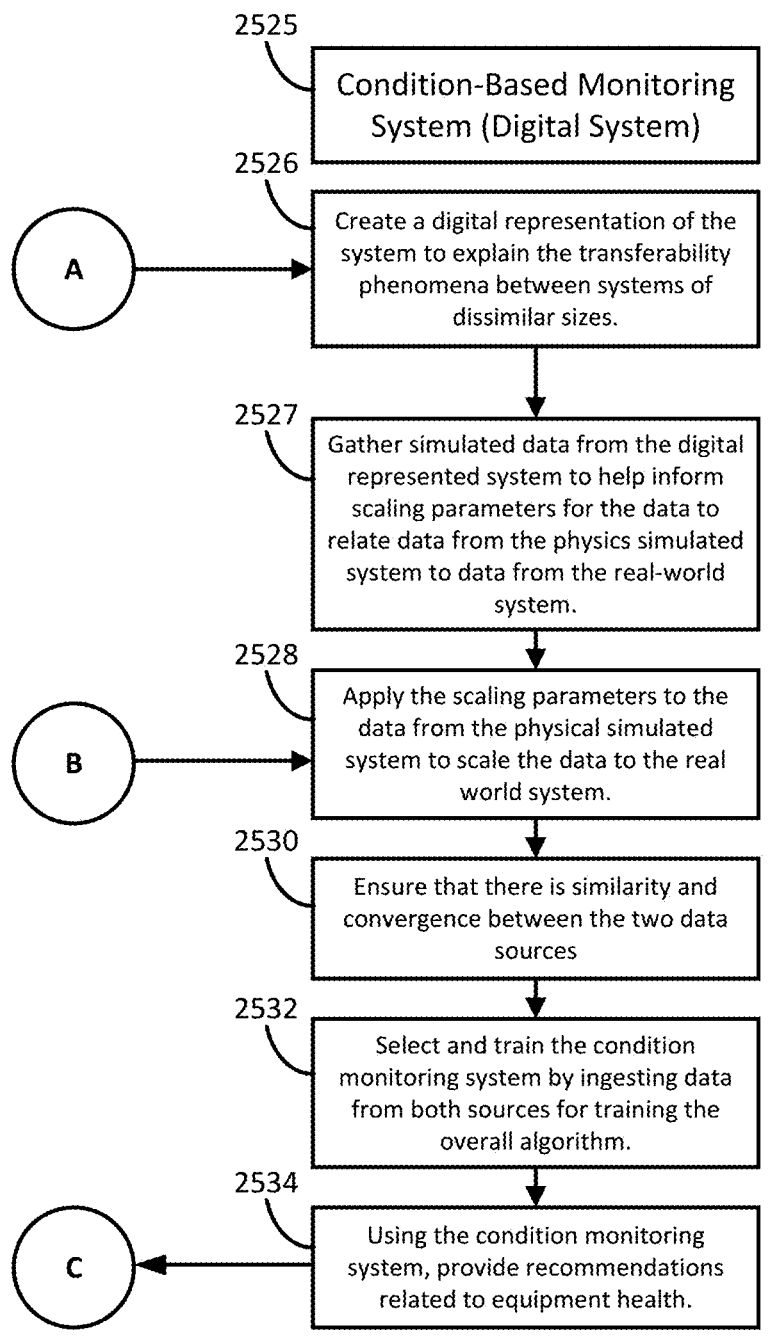
FIG. 25B is a flow chart showing the operation of aspects of the system.

Referring to FIGS. 25A and 25B, the relationship between the ability to model (physically or digitally) an operational component with a testing component is shown. In one embodiment, the operational environment 2500 is used and an operational component is identified at 2502 for analysis. In applications, the more critical the component is the operational system, the higher the benefit of the present system can provide since failure of critical components tends to have more negative results. Therefore, prediction and prevention of such failures offer a benefit as opposed to waiting for a component to fail. An operational component characteristics dataset can be developed at 2504 from information such as the operating properties (e.g., operational time, revolutions, cycles, power usage, load, forces, vibrations, ambient properties, environmental properties, etc.), operating procedures, maintenance history, and data samples of the operations of an operational component. Ambient properties can include the forces on one or more aspects of a machine and other effects on the machine or component. Environmental properties can include ambient temperature, humidity, atmospheric pressure, ambient pressures and the like. One or more operational components can be selected for analysis.

At 2508 the testing system (e.g., surrogate system) can be defined. Factors that can impact the operational component and that can lead to a failure state can be determined at 2510. A testing process and testing device can be designed or obtained at 2512 according to the operational characteristics of the operational complaints. For example, if the operational component is a bearing, the testing device can receive a testing component, rotate the testing component under the same or similar conditions as the operational component. If the operational component is a spindle, the spindle can be rotated against a force to place a load on the spindle. The testing device can also operation the testing component under higher cycles or revolutions allowing for a failure state to be reached faster than may normally be seem in the operational environment. The testing process and testing device can be designed, creating, or otherwise obtained at 2512. The testing device can be used to generate a dataset representing failure states from the operation of the testing device and the data that is collected as the testing component approaches or passes one or more failure states at 2514. The failure dataset can be received in a monitoring system at the operational site at 2516 where it can be used to compare the conditions of the testing device approaching a failure state with the operation of the operational component. The system can monitor the operating conditions of the operating component and when the operating component presents properties that are associated with approaching or passing a failure states, the system can create, display, and transmit a respective indication. For example, a spindle in the testing device may show that a spindle at 12,000 rpm begins to show unacceptable wobble when the noise level emanating from the spindle exceeds 45 dB (with 10 dB being background noise). In this example, when the operational spindle reaches 70 dB (with 25 dB background noise) the system can provide an indication that the operational spindle may be approaching or has undesired wobble (e.g., a failure state). In this example, the testing data set is created with a testing device. The failure dataset is provided to a monitoring system at the operational site and the operational component can be monitors and indicators can be provided to a user when the operational component approaches or passes a failure state.

In operation, the monitoring system can continue to receive operational data at 2518. Operational data can be included in the operational component characteristics dataset and can include operational conditions, performance, maintenance, replacement and other actions and events at the operational component. This information can be transmitted to a computer device at 2520 that can modify the failure dataset accordingly. For example, if the failure dataset include a failure state indication that a spindle may reach a failure state at 70 dB, but the operational component is consistently replaced at 65 dB, the computer device can modify the failure dataset and lower the failure state noise levels triggered to provide the indication of a potential failure state. Therefore, multiple sites and monitoring systems operators can benefit from operational data received at one site as the failure dataset can be updated at each monitoring site, especially those with similar operational components. Information from the computer device and the monitoring device can be used at 2522 to improve the operation and operating life of the operational component. In the event of operational failure, the information can be provided to the computer device that can update the dataset accordingly at 2524.

The system can use a digital representation of the physical components 2525. From the dataset representing failure state and the operational information gathered from the operational component, machine and environment, a digital representation of the operational component can be provided at 2526 and 2527. The digital representation can include a scaling factor between a testing component and the operational component so that information from the testing device can be scaled to the operational component. For example, in a bearing, if a ball bearing in a testing component has a diameter of $D_t$ then the distance that the ball bearing will travel for $R_t$ revolutions is $D_t*\pi*R_t$. If the noise level if the testing ball bearing shows that a failure state is approached at 40 dB, then the monitoring system can determine that when an operational ball bearing has traveled distance and the noise level is at or above 40 dB (less ambient noise), the operational component may be approaching a failure state. The diameter of the operational ball bearing can be larger than that of the testing ball bearing so that less revolutions are needed for the operational ball bearing to reach the distance traveled associated with this failure state. This process can be determined the any number of operational conditions at 2526a and 2526b. Once determined the monitoring system can provide notifications for potential and actual failure states of the operational component at 2528. The testing system, monitoring system and the correlation between the two can be compared and validated, or adjustments made to the system at 2530 to provide convergence between the results and prediction of the systems. For example, if the monitoring system include a failure state of a bearing under certain condition after X rotations, and the bearing shows no signs of a failure states after X rotations, the failure dataset may increase the miles traveled associated with a certain noise level, of other operating condition, to allow the predictions and results to better converge. The information from one or more testing systems and one or more monitoring systems can be transmitted to a server and used to update the failure dataset. Therefore, the dataset on the server can benefit from multiple testing systems and monitoring systems, update the dataset that can be used by each monitoring system providing for a "crowd sourced" feedback and learning process at 2532. In operation and at 2534, the server and monitoring systems can provide for recommendations, indications and predictions concerning the operational component that can be used to detect and prevent failure states.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

It will be appreciated that any module or component exemplified herein that executes instructions may include or otherwise have access to computer readable media such as storage media, computer storage media, or data storage devices (removable and/or non-removable) such as, for example, magnetic disks, optical disks, tape, and other forms of computer readable media. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD), blue-ray disks, or other optical storage, magnetic cassettes, magnetic tape, magnetic disk storage or other magnetic storage devices, or any other medium which can be used to store the desired information, and which can be accessed by an application, module, or both. Any such computer storage media may be part of the mobile device, tracking module, object tracking application, etc., or accessible or connectable thereto. Any application or module herein described may be implemented using computer readable/executable instructions that may be stored or otherwise held by such computer readable media.

Thus, alterations, modifications and variations can be affected to the particular embodiments by those of skill in the art without departing from the scope of this disclosure, which is defined solely by the claims appended hereto.

The system and method may be practiced in various embodiments. A suitably configured computer device, and associated communications networks, devices, software, computer readable instructions, firmware and any combination thereof may provide a platform for enabling one or more of the features, functions, processes, and steps as described above.

What is claimed is:

1. A system of predicting machine failure comprising:
a testing device for testing a testing component adapted to provide failure data according to an artificially induced defect in the testing component;
a testing computer in communication with the testing device;
a set of testing computer readable instructions adapted for:
generating a failure dataset according to the failure data and includes a failure state,
receiving an operational component characteristics dataset,
capturing a failure dataset according to the operational component characteristics dataset with a testing component characteristic dataset, receiving performance information from a monitoring device, and updating the failure dataset according to the performance information;

a monitoring device in communication with the testing computer;

a sensor in communication with the monitoring device;

a set of monitoring computer readable instructions included in the monitoring device adapted for: receiving the failure dataset, receiving a performance information representing an operational characteristic for an operational component, creating a remedial action according to a comparison of the performance information with the failure dataset, transmitting the remedial action to the testing computer; and, wherein the set of testing computer readable instructions is adapted to create a usable lifetime model according to testing and determining a difference between the usable lifetime model and an operational information associated with an operational component and modifying the failure dataset according to the difference.

2. The system of claim 1 wherein the artificially induced defect results from inadequate lubrication, contamination, damage, fatigue and any combination thereof.

3. The system of claim 1 wherein the failure dataset includes a failure timeline according to a known defect type wherein the failure timeline includes failure states prior to a complete failure of the operational component.

4. The system of claim 1 wherein the operational component is a rotating component.

5. The system of claim 4 wherein the operational component is a bearing.

6. The system of claim 1 wherein a testing sensor included in the testing device and is adapted for sensing an operation of the testing device.

7. The system of claim 1 wherein the failure dataset includes a usable lifetime model created by using a method of prewhitening the failure dataset and performing an envelope spectrum analysis on the prewhitened failure data.

8. The system of claim 1 where in the artificially induced defect includes an induced defect input selected from the group consisting of a rotating element, rotational speed, element diameter, cycles, element length, travel path, pitch, contact angle, contact surface, load, tensile force, shear force, viscosity, thermal conductivity, electrical conductivity, and any combination thereof.

9. The system of claim 1 wherein the operational component is a first operational component, and the set of testing computer readable instructions are adapted for receiving a current status of a second operation component, mapping the current status of the second operational component to the usable lifetime model, determining a difference between the usable lifetime model and the a failure timeline of the second operational component and modifying the usable lifetime model according to the difference between the usable lifetime model and the failure timeline of the second operational component.

10. A system of predicting equipment failure comprising:

a testing assembly for testing a testing component wherein the testing component includes a defect in a critical area included in the testing component;

a sensor in communication with the testing assembly for sensing a failure state of the testing component, a set of testing computer readable instructions included in the testing assembly adapted for:

receiving a critical failure mode associated with the testing component, receiving a testing dataset from the testing assembly representing a set of testing results of a testing component produced by the testing assembly wherein the testing dataset includes initial data representing an undamaged component and a failure dataset representing a failure state of the testing component, isolating a set of failure data representing a testing status of the testing component from initial testing to failure of the testing component determined by the critical failure mode, and, creating a usable lifetime model of the testing component according to the set of failure data;

transmitting the usable lifetime model to a monitor device adapted to monitor an operational device and display a notification when an operational component approaches the failure state; and, wherein the set of testing computer readable instructions is adapted to create a usable lifetime model according to testing and determining a difference between the usable lifetime model and an operational information associated with an operational component and modifying the failure dataset according to the difference.

11. The system of claim 10 wherein the failure dataset wherein the failure state is a first failure state and the failure state include a catastrophic failure state.

12. The system of claim 10 wherein the set of testing computer readable instructions are adapted for defining a usable lifetime model associated with a testing component.

13. The system of claim 10 wherein the usable lifetime model is adapted to be modified according to a mapping of a current status of an operational component to the usable lifetime model thereby providing a machine learning feedback system.

14. The system of claim 10 wherein the usable lifetime model is adapted to be modified according to a mapping of a current status of a plurality of operational components to the usable lifetime model.

15. The system of claim 10 wherein the defect in a critical area is a first defect and the testing dataset includes data according to a second defect.

16. The system of claim 10 wherein the usable lifetime model is adapted to provide progressive damage anticipation from use of an operational component.

17. The system of claim 10 wherein the set of testing computer readable instructions are adapted for receiving an actual failure state of the operational component from a monitoring device and modifying the failure dataset according to a comparison between the failure dataset and the actual failure state.

18. The system of claim 10 wherein the usable lifetime model is created according to artificially inducing a defect in the testing component by providing inadequate lubrication, contamination, damage, fatigue or any combination thereof.

* * * * *